US012441125B2

(12) United States Patent
Oda

(10) Patent No.: US 12,441,125 B2
(45) Date of Patent: Oct. 14, 2025

(54) ENERGY RAY IRRADIATION DEVICE AND INKJET IMAGE FORMING APPARATUS

(71) Applicant: Konica Minolta Inc., Tokyo (JP)

(72) Inventor: Shoji Oda, Higashimurayama (JP)

(73) Assignee: KONICA MINOLTA INC., Tokyo (JP)

( * ) Notice: Subject to any disclaimer, the term of this patent is extended or adjusted under 35 U.S.C. 154(b) by 252 days.

(21) Appl. No.: 18/449,063

(22) Filed: Aug. 14, 2023

(65) Prior Publication Data

US 2024/0066892 A1 Feb. 29, 2024

(30) Foreign Application Priority Data

Aug. 30, 2022 (JP) ................................ 2022-137054

(51) Int. Cl.
*B41J 11/00* (2006.01)

(52) U.S. Cl.
CPC ...... *B41J 11/00214* (2021.01); *B41J 11/0022* (2021.01)

(58) Field of Classification Search
CPC .............. B41J 11/00214; B41J 11/0022; B41J 11/00218; B41J 11/0021; B41J 11/00216; B41J 29/377; B29C 2035/0827
See application file for complete search history.

(56) References Cited

U.S. PATENT DOCUMENTS

| | | | | |
|---|---|---|---|---|
| 4,434,562 A * | 3/1984 | Bubley | B41F 23/0409 | 422/186 |
| 7,963,647 B2 * | 6/2011 | Nakata | B41J 11/00214 | 347/102 |
| 8,162,468 B2 * | 4/2012 | Kulpa | B41J 11/00214 | 347/17 |
| 2005/0068397 A1 * | 3/2005 | Yokoyama | B41J 11/00218 | 347/102 |
| 2009/0207223 A1 * | 8/2009 | Cofler | B41J 11/00218 | 118/620 |
| 2018/0001665 A1 * | 1/2018 | Isozaki | B41J 11/0022 | |
| 2019/0315132 A1 * | 10/2019 | Doo | B41J 25/001 | |
| 2020/0269606 A1 * | 8/2020 | Fujisawa | B41J 11/0021 | |

FOREIGN PATENT DOCUMENTS

JP 2012217873 A 11/2012

* cited by examiner

*Primary Examiner* — John P Zimmermann
(74) *Attorney, Agent, or Firm* — CANTOR COLBURN LLP

(57) ABSTRACT

An energy ray irradiation device includes: an irradiator that faces a conveyance surface and irradiates an ink on a recording medium conveyed on the conveyance surface with an energy ray; an enclosure part that encloses a space between the irradiator and the conveyance surface by a plate member including a first plate member that extends from an end of the irradiator on an upstream side in a conveyance direction toward the conveyance surface on an upstream side of the end; and a first blowout part that supplies a non-reactive gas that does not react with the ink from an end of the first plate member on the upstream side in the conveyance direction into the enclosure part.

18 Claims, 14 Drawing Sheets

FIG. 4A

| CONVENTIONAL TECHNIQUE | | MEASUREMENT POINT | | |
|---|---|---|---|---|
| | | UPSTREAM | MIDDLE | DOWNSTREAM |
| CONVEYANCE SPEED | LOW | ○ | ◎ | ◎ |
| | MEDIUM | × | △ | ○ |
| | HIGH | × | △ | ○ |

◎ : HIGH CONCENTRATION
○ : MEDIUM CONCENTRATION
△ : LOW CONCENTRATION
× : ATMOSPHERIC STATE

FIG. 4B

| PRESENT INVENTION (PRESENT EMBODIMENT) | | MEASUREMENT POINT | | |
|---|---|---|---|---|
| | | UPSTREAM | MIDDLE | DOWNSTREAM |
| CONVEYANCE SPEED | LOW | ◎ | ◎ | ◎ |
| | MEDIUM | ◎ | ◎ | ◎ |
| | HIGH | ○ | ○ | ◎ |

◎ : HIGH CONCENTRATION
○ : MEDIUM CONCENTRATION
△ : LOW CONCENTRATION
× : ATMOSPHERIC STATE

FIG. 10

| RATIO BETWEEN SUCTION AMOUNT AND EJECTION AMOUNT | | SUCTION AMOUNT | | | | |
|---|---|---|---|---|---|---|
| | | 1 | 2 | 3 | 4 | 5 |
| EJECTION AMOUNT | 1 | ○ | ◎ | ○ | × | — |
| | 2 | △ | ○ | △ | △ | × |
| | 3 | × | △ | ○ | ○ | △ |

◎ : HIGH CONCENTRATION
○ : MEDIUM CONCENTRATION
△ : LOW CONCENTRATION
× : ATMOSPHERIC STATE
— : NOT EXPERIMENTED

ENERGY RAY IRRADIATION DEVICE AND INKJET IMAGE FORMING APPARATUS

CROSS REFERENCE TO RELATED APPLICATIONS

The present invention claims priority under 35 U.S.C. § 119 to Japanese Application, 2022-137054, filed on Aug. 30, 2022, the entire contents of which being incorporated herein by reference.

BACKGROUND

Technological Field

The present invention relates to an energy ray irradiation device and an inkjet image forming apparatus that irradiate an ink on a recording medium with energy rays.

Description of the Related Art

It is known to irradiate an ink ejected onto a recording medium such as a sheet with energy rays to cure the ink. For example, the ultraviolet (UV) ink is cured by irradiation with UV light (ultraviolet rays).

Some of the inks described above are not sufficiently cured due to the presence of oxygen in the surroundings, which hinders curing. For example, in the case of the UV ink, depending on the type, if oxygen is present in the surroundings at the time of ultraviolet irradiation, the curing is hindered, and the UV ink may not be sufficiently cured. Therefore, a nitrogen purge technique of removing surrounding oxygen at the time of ultraviolet irradiation is known (see, for example, JP 2012-217873 A).

The recording medium on which the ink is ejected may have a high conveyance speed depending on a print speed or the like. If the conveyance speed of the recording medium increases, the flow rate of a laminar flow (hereinafter, referred to as "air laminar flow" for convenience) of air in conveying the recording medium increases, and there is a problem that the concentration of nitrogen decreases unless the supply amount of nitrogen is increased.

The device disclosed in JP 2012-217873 A is configured to supply nitrogen gas to an ultraviolet irradiation area but is not configured in consideration of an air laminar flow in conveying a recording medium. Therefore, if the conveyance speed of the recording medium increases, the concentration of nitrogen decreases on the upstream side in a conveyance direction, and the concentration of nitrogen becomes non-uniform in the irradiation area (see FIG. 4A to be described later).

SUMMARY

An object of the present invention is to provide an energy ray irradiation device and an inkjet image forming apparatus capable of stably ensuring the concentration of a non-reactive gas even when a conveyance speed increases.

To achieve the abovementioned object, according to an aspect of the present invention, an energy ray irradiation device reflecting one aspect of the present invention comprises: an irradiator that faces a conveyance surface and irradiates an ink on a recording medium conveyed on the conveyance surface with an energy ray; an enclosure part that encloses a space between the irradiator and the conveyance surface by a plate member including a first plate member that extends from an end of the irradiator on an upstream side in a conveyance direction toward the conveyance surface on an upstream side of the end; and a first blowout part that supplies a non-reactive gas that does not react with the ink from an end of the first plate member on the upstream side in the conveyance direction into the enclosure part.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 4A is a diagram showing measurement results of the concentration of a non-reactive gas in a conventional energy ray irradiation device.

FIG. 4B is a diagram showing measurement results of the concentration of the non-reactive gas in the energy ray irradiation device according to the embodiment of the present invention.

FIG. 10 is a diagram showing measurement results of the concentration of the non-reactive gas in the energy ray irradiation device for a ratio between a suction amount at which the first suction part sucks air and an ejection amount at which the ejector ejects air.

DETAILED DESCRIPTION OF EMBODIMENTS

Hereinafter, one or more embodiments of the present invention will be described with reference to the drawings. However, the scope of the invention is not limited to the disclosed embodiments.

[Image Forming Apparatus]

Figure 1:
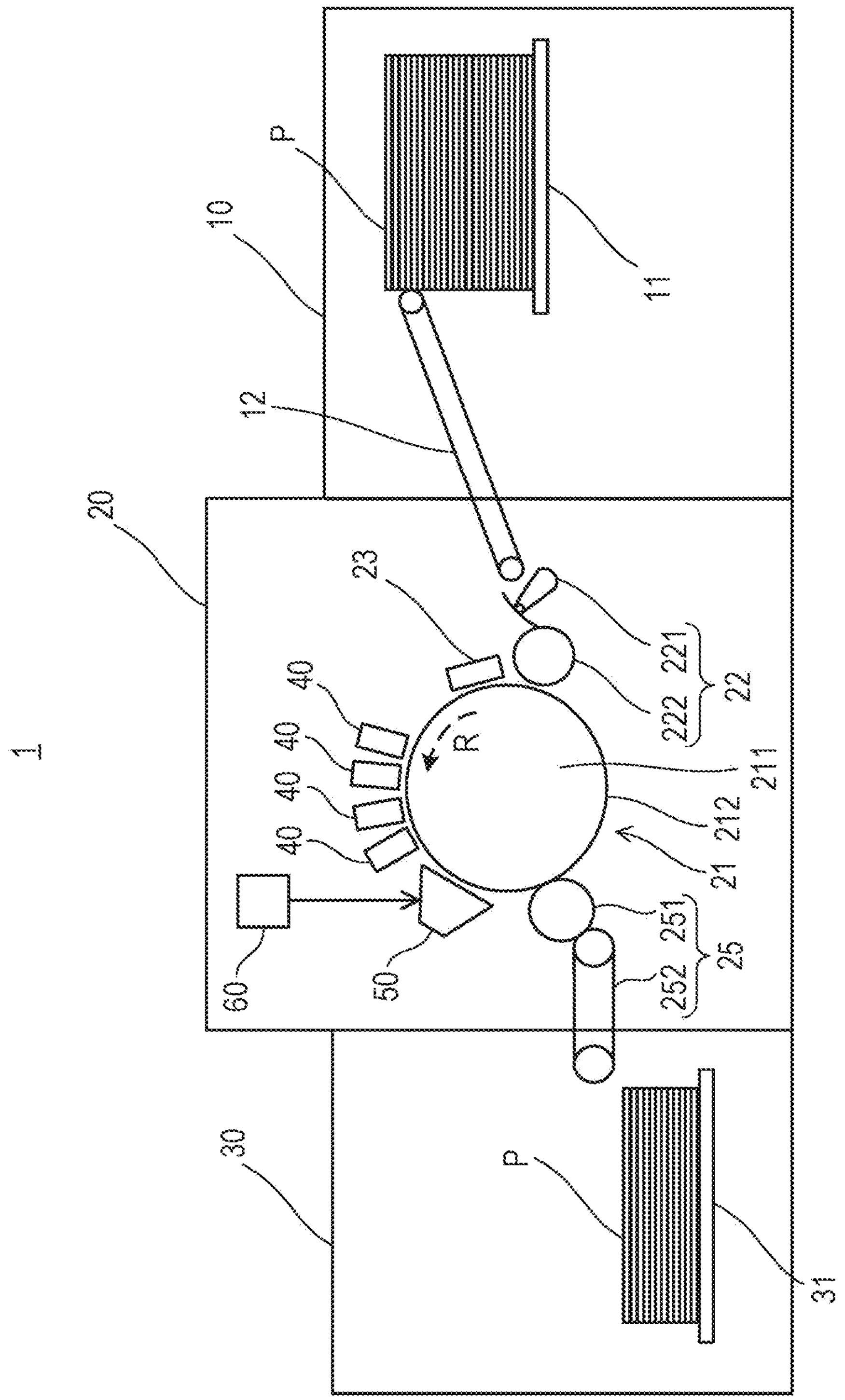
FIG. 1 is a diagram schematically illustrating an image forming apparatus according to an embodiment of the present invention.
Figure 2:
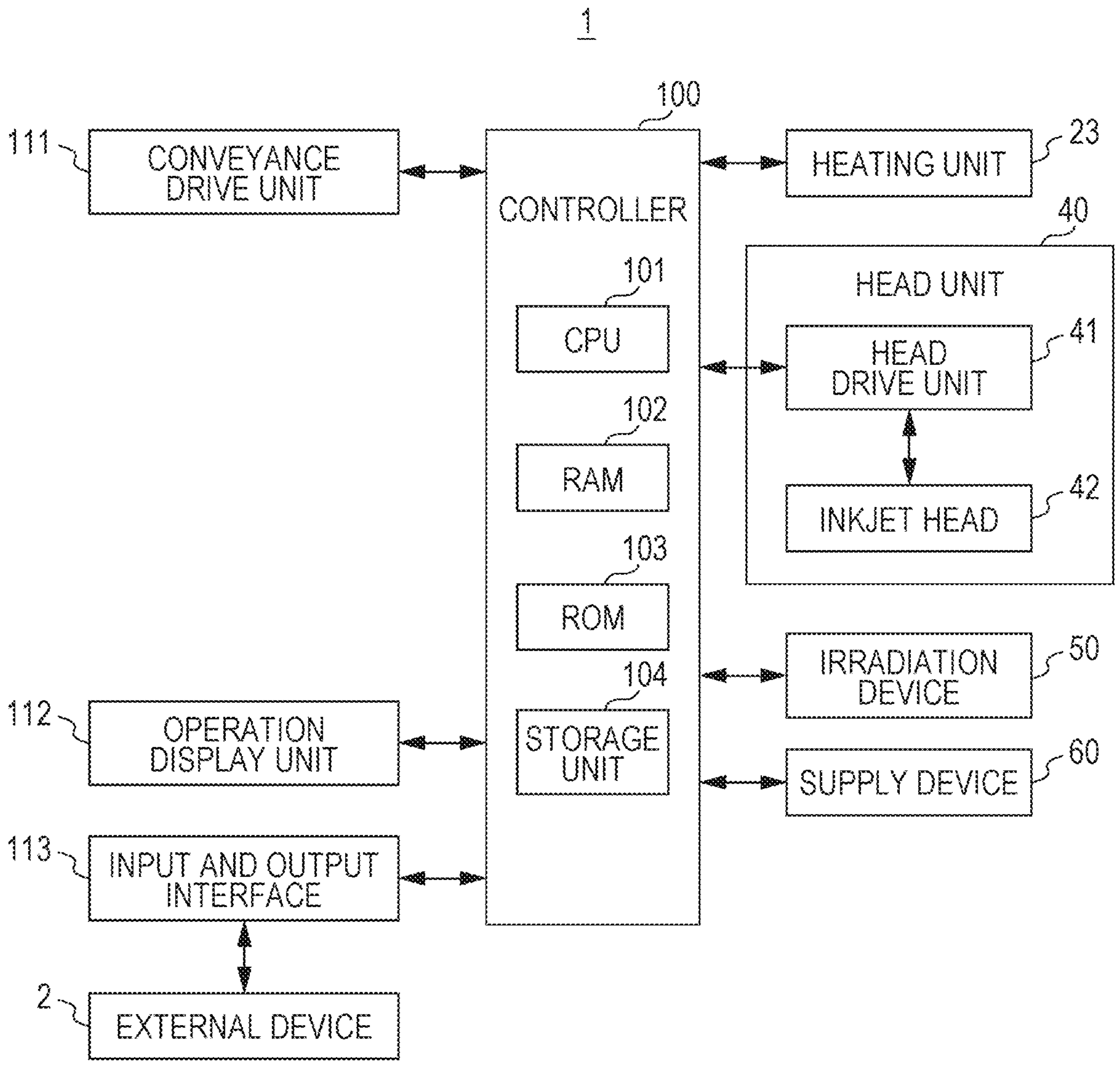
FIG. 2 is a block diagram illustrating a main part of a control system of the image forming apparatus illustrated in FIG. 1.

FIG. 1 is a diagram schematically illustrating an image forming apparatus 1 according to the present embodiment. FIG. 2 is a block diagram illustrating a main part of a control system of the image forming apparatus 1.

The image forming apparatus 1 (inkjet image forming apparatus in the present invention) includes a sheet feeder 10, an image former 20, a sheet ejector 30, a controller 100 (see FIG. 2), and the like.

Under the control of the controller 100, the image forming apparatus 1 conveys a recording medium P stored in the sheet feeder 10 to the image former 20, forms an image on the recording medium P in the image former 20, and conveys the recording medium P having the image formed thereon to the sheet ejector 30.

As the recording medium P, various media capable of fixing an ink ejected from an inkjet head 42 to be described later can be used. The recording medium P is, for example, a medium such as sheet-like paper, cloth (fabric), or resin. The recording medium P is not limited to a sheet-like medium and may be a rolled medium such as rolled paper, cloth, or resin.

The sheet feeder 10 includes a sheet feed tray 11 that stores the recording medium P and a medium supply unit 12 that conveys and supplies the recording medium P from the sheet feed tray 11 to the image former 20. The medium supply unit 12 includes an annular belt whose inside is supported by two rollers and conveys the recording medium P from the sheet feed tray 11 to the image former 20 by rotating the rollers in a state where the recording medium P is placed on the belt.

The image former 20 includes a conveyance unit 21, a transfer unit 22, a heating unit 23, a delivery unit 25, a head unit 40, an irradiation device 50, a supply device 60, and the like.

The conveyance unit 21 includes a cylindrical conveyance drum 211. The conveyance unit 21 is configured to hold the recording medium P placed on a conveyance surface 212 (a placement surface) of the conveyance drum 211. Then, the conveyance unit 21 performs a conveyance operation of conveying the recording medium P placed on the conveyance surface 212 by the conveyance drum 211 rotating in an R direction indicated by a broken line arrow around a rotating shaft (not illustrated) and circularly moving.

Here, the conveyance unit 21 that conveys the recording medium P by the conveyance drum 211 is exemplified as an example, but the conveyance unit 21 is not limited to the conveyance drum 211 and may be configured to convey the recording medium P by a conveyance belt or a conveyance roller.

The transfer unit 22 passes the recording medium P conveyed by the medium supply unit 12 of the sheet feeder 10 to the conveyance unit 21. The transfer unit 22 is provided at a position between the medium supply unit 12 of the sheet feeder 10 and the conveyance unit 21, holds and picks up one end of the recording medium P conveyed from the medium supply unit 12 by a swing arm portion 221, and passes the recording medium P to the conveyance unit 21 via a transfer drum 222.

The heating unit 23 is provided between the arrangement position of the transfer drum 222 and the arrangement position of the head unit 40 and heats the recording medium P in such a manner that the recording medium P conveyed by the conveyance unit 21 has a temperature within a predetermined temperature range. The heating unit 23 includes, for example, an infrared heater, and energizes the infrared heater on the basis of a control signal supplied from the controller 100 to cause the infrared heater to generate heat.

The head unit 40 ejects an ink onto the recording medium P from a nozzle provided on an ink ejection surface facing the conveyance surface 212 of the conveyance drum 211 at an appropriate timing based on the rotation of the conveyance drum 211 holding the recording medium P to form an image.

The head unit 40 is disposed in such a manner that the ink ejection surface and the conveyance surface 212 are separated by a predetermined distance. Here, four head units 40 corresponding to inks of four colors, that is, yellow (Y), magenta (M), cyan (C), and black (K) are arranged at predetermined intervals in the order of Y, M, C, and K from the upstream side in the conveyance direction of the recording medium P.

The irradiation device 50 (energy ray irradiation device in the present invention) is arranged between the arrangement position of the head unit 40 and the arrangement position of a transfer drum 251 of the delivery unit 25 in the conveyance direction. The irradiation device 50 includes an irradiator 51 (see FIG. 3A to be described later) extending across the width of the conveyance unit 21 (the width in the rotating shaft direction of the conveyance drum 211). The irradiator 51 faces the conveyance surface 212 and irradiates the ink on the recording medium P placed on the conveyance surface 212 and conveyed on the conveyance surface 212 with active energy rays such as infrared rays or ultraviolet rays to dry or cure the ink, thereby fixing the ink on the recording medium P.

Figure 3A:
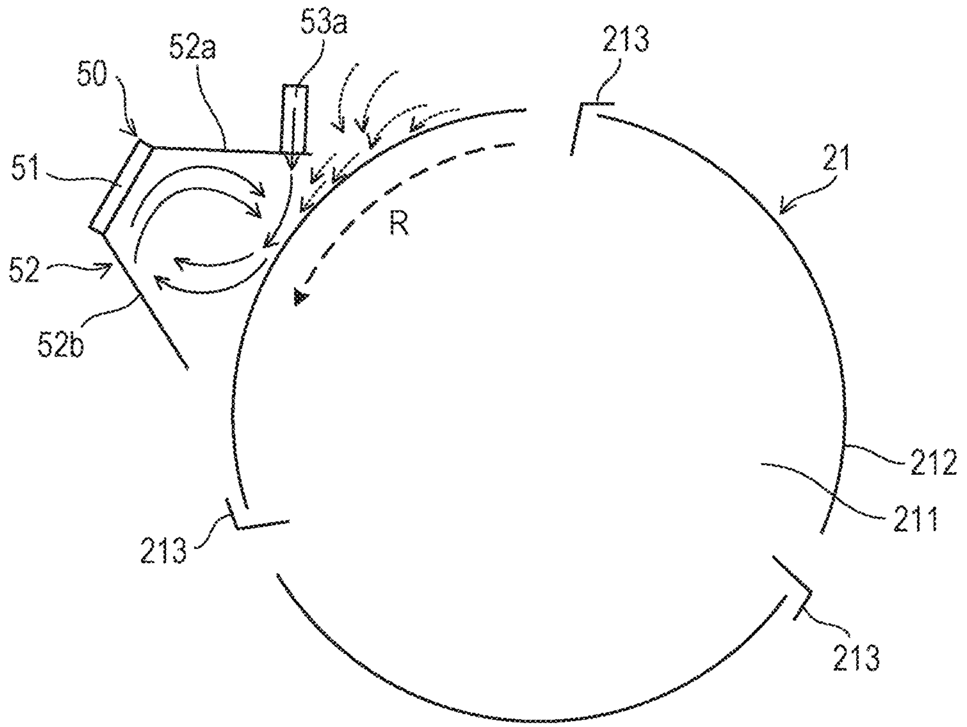
FIG. 3A is a diagram schematically illustrating an energy ray irradiation device according to the embodiment of the present invention.

The supply device 60, which will be described later in detail with reference to FIG. 3A, is a device that supplies a non-reactive gas (for example, a rare gas such as helium, or an inert gas such as nitrogen or carbon dioxide) that does not react with the ink into the irradiation device 50.

The delivery unit 25 includes a belt loop 252 having an annular belt whose inside is supported by two rollers, and the cylindrical transfer drum 251 that transfers the recording medium P from the conveyance unit 21 to the belt loop 252. The delivery unit 25 conveys the recording medium P transferred from the conveyance unit 21 onto the belt loop 252 by the transfer drum 251 using the belt loop 252 and sends the recording medium P to the sheet ejector 30.

The sheet ejector 30 includes a plate-like sheet ejection tray 31 on which the recording medium P sent from the image former 20 by the delivery unit 25 is placed.

As illustrated in FIG. 2, the image forming apparatus 1 includes, as the main part of the control system, the heating unit 23, the head unit 40, the irradiation device 50, the supply device 60, the controller 100, a conveyance drive unit 111, an operation display unit 112, an input and output interface 113, and the like.

The controller 100 includes a central processing unit (CPU) 101, a random access memory (RAM) 102, a read only memory (ROM) 103, a storage unit 104, and the like.

The CPU 101 reads various control programs and setting data stored in the ROM 103, stores the programs and the setting data in the RAM 102, and executes the programs to perform various arithmetic processing. The CPU 101 integrally controls the entire operation of the image forming apparatus 1.

The RAM 102 provides the CPU 101 with a working memory space and stores temporary data. The RAM 102 may include a nonvolatile memory.

The ROM 103 stores various control programs executed by the CPU 101, setting data, and the like. Instead of the ROM 103, a rewritable nonvolatile memory such as an electrically erasable programmable read only memory (EEPROM) or a flash memory may be used.

The storage unit 104 stores a print job (an image recording command) input from an external device 2 via the input and output interface 113 and image data related to the print job. As the storage unit 104, for example, a hard disk drive (HDD) or a solid state drive (SSD) is used, or a dynamic random access memory (DRAM) or the like may be used in combination.

The conveyance drive unit 111 supplies a drive signal to a conveyance drum motor of the conveyance drum 211 on the basis of a control signal supplied from the controller 100. As a result, the conveyance drive unit 111 rotates the conveyance drum 211 at a predetermined speed and at a predetermined timing. Furthermore, the conveyance drive unit 111 supplies a drive signal to a motor for operating the medium supply unit 12, the transfer unit 22, and the delivery unit 25 on the basis of a control signal supplied from the controller 100. As a result, the conveyance drive unit 111 supplies the recording medium P to the conveyance drum 211 and discharges the recording medium P from the conveyance drum 211.

The operation display unit 112 is, for example, a flat panel display such as liquid crystal with a touch panel or organic electro luminescence (EL). The operation display unit 112 displays an operation menu for a user, information related to image data, various states of the image forming apparatus 1, and the like. In addition, the operation display unit 112 includes a plurality of keys and receives various input operations of the user.

The input and output interface 113 mediates transmission and reception of data between the external device 2 and the controller 100. The input and output interface 113 includes, for example, any of various serial interfaces and various parallel interfaces, or a combination thereof.

The external device 2 is, for example, a personal computer, and supplies an image recording command (a print job), image data, and the like to the controller 100 via the input and output interface 113.

As described above, the heating unit 23 includes an infrared heater or the like. The heating unit 23 energizes the infrared heater to generate heat and heats the recording medium P on the basis of a control signal supplied from the controller 100.

The head unit 40 includes a head drive unit 41, the inkjet head (hereinafter, referred to as "head") 42, and the like.

Although not illustrated, the head unit 40 includes a sub-tank, a member related to ink supply (for example, a pump, a valve, or the like), and the like. The ink supplied from the main tank corresponding to each head unit 40 is stored in the sub-tank in the head unit 40. A plurality of heads 42 are connected to the sub-tank, and the ink is supplied from the sub-tank to these heads 42.

The head drive unit 41 generates a drive pulse based on image data on the basis of a control signal supplied from the controller 100 and applies the drive pulse to the head 42 at an appropriate timing to drive the head. As a result, an amount of ink corresponding to the pixel value of the image data is ejected from the plurality of nozzles of the head 42 to form an image.

The irradiation device 50 controls the irradiator 51 on the basis of a control signal supplied from the controller 100 to cause the irradiator 51 to emit light. By irradiating the recording medium P with energy rays such as infrared rays or ultraviolet rays from the irradiator 51, the ink ejected onto the recording medium P is dried or cured to fix the ink.

The supply device 60 controls the supply amount or the like of a non-reactive gas (for example, nitrogen) to be supplied into the irradiation device 50 on the basis of a control signal supplied from the controller 100 and supplies the non-reactive gas into the irradiation device 50.

With the configuration described above, the image forming apparatus 1 ejects ink from the head unit 40 onto the recording medium P conveyed on the conveyance surface 212 to form an image, and irradiates the ink ejected onto the recording medium P with energy rays from the irradiation device 50 to fix the ink onto the recording medium P. When the ink ejected onto the recording medium P is irradiated with energy rays from the irradiation device 50, a non-reactive gas is supplied from the supply device 60 into the irradiation device 50 so as to remove oxygen that hinders the curing of the ink.

Meanwhile, the recording medium P on which an ink is ejected may have a high conveyance speed depending on a print speed or the like. If the conveyance speed of the recording medium P increases, the flow rate of an air laminar flow in conveying the recording medium P increases, and there is a problem that the concentration of the non-reactive gas decreases unless the supply amount of the non-reactive gas is increased.

Therefore, in the present embodiment, the irradiation device 50 includes an enclosure part 52 that surrounds the space between the irradiator 51 and the conveyance surface 212 with a plate member (see FIG. 3A). The plate member includes a first plate member 52*a* extending from an end of the irradiator 51 on the upstream side in the conveyance direction toward the conveyance surface 212 on the upstream side of the end. Furthermore, the irradiation device 50 includes a first blowout part 53*a* that supplies a non-reactive gas that does not react with an ink into the enclosure part 52 from the end of the first plate member 52*a* on the upstream side in the conveyance direction (see FIG. 3A).

Figure 3B:
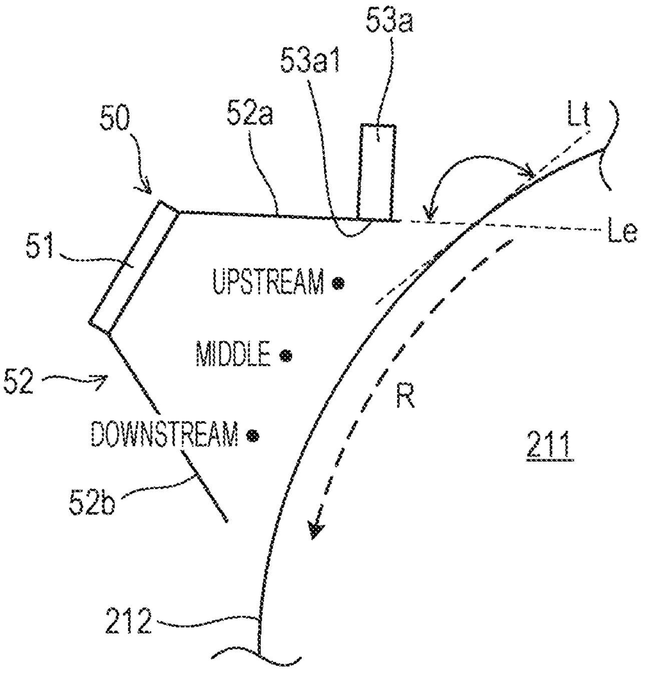
FIG. 3B is a diagram for explaining the energy ray irradiation device illustrated FIG. 3A.

The irradiation device 50 of the present embodiment with such a configuration will be described in detail with reference to FIG. 3A and FIG. 3B. FIG. 3A is a diagram schematically illustrating the irradiation device 50. FIG. 3B is a diagram for explaining the irradiation device 50 illustrated FIG. 3A.

It is assumed in the following description that, as an example, the ink ejected by the head unit 40 onto the recording medium P is "UV ink", and the energy ray irradiated by the irradiator 51 is "ultraviolet ray".

The irradiation device 50 includes the irradiator 51 described above and the enclosure part 52 surrounding the space between the irradiator 51 and the conveyance surface 212. The irradiator 51 extends across the width of the conveyance unit 21 (the width in the rotating shaft direction of the conveyance drum 211), and the enclosure part 52 is disposed to surround the space between the irradiator 51 and the conveyance surface 212, together with the irradiator 51.

The enclosure part 52 includes the first plate member 52*a* on the upstream side in the conveyance direction, a second plate member 52*b* on the downstream side in the conveyance direction, and a third plate member 52*c* and a fourth plate member 52*d* (see FIG. 13A and FIG. 13B to be described later) which are not illustrated in FIG. 3A and FIG. 3B.

The first plate member 52*a* extends from the end of the irradiator 51 on the upstream side in the conveyance direction toward the conveyance surface 212 on the upstream side of the end. For example, in a case where the conveyance surface 212 is the outer circumferential surface of the conveyance drum 211, as illustrated in FIG. 3B, the first plate member 52*a* is disposed so as to be inclined with respect to a tangent line Lt at the intersection of an extension line Le along the direction in which the first plate member 52*a* extends and the conveyance surface 212. In addition, the first plate member 52*a* extends across the width of the irradiator 51 in a width direction W of the conveyance unit 21 (see FIG. 13A and FIG. 13B to be described later).

The second plate member 52*b* extends from the downstream side of the irradiator 51 in the conveyance direction toward the conveyance surface 212. The second plate member 52*b* may extend in such a manner that the extension line along the direction in which the second plate member 52*b* extends is orthogonal to the conveyance surface 212 but may extend from the end of the irradiator 51 on the downstream side in the conveyance direction toward the conveyance surface 212 on the downstream side of the end in consideration of increasing the irradiation area of the irradiator 51. The second plate member 52*b* also extends across the width of the irradiator 51.

The third plate member 52*c* and the fourth plate member 52*d* are arranged at both ends of the irradiator 51 in the width direction W and connect the first plate member 52*a* on the upstream side in the conveyance direction and the second plate member 52*b* on the downstream side in the conveyance direction.

With the first plate member 52*a*, the second plate member 52*b*, the third plate member 52*c*, and the fourth plate member 52*d*, the enclosure part 52 surrounds the space between the irradiator 51 and the conveyance surface 212 together with the irradiator 51.

Furthermore, in the first plate member 52*a*, the first blowout part 53*a* is disposed at an end on the upstream side in the conveyance direction. The first blowout part 53*a* is connected to the supply device 60, and the non-reactive gas supplied from the supply device 60 is supplied into the enclosure part 52 from the end of the first plate member 52*a* on the upstream side in the conveyance direction via the first blowout part 53*a*.

The first blowout part 53*a* is configured to blow out the non-reactive gas across the width of the irradiator 51. For example, a blowout port 53*a*1 (see FIG. 3B) of the first blowout part 53*a* extends across the width of the irradiator 51. A large number of blowout ports 53*a*1 may be provided along the width of the irradiator 51 to blow out the non-reactive gas across the width of the irradiator 51.

In this manner, an air curtain is formed by a non-reactive gas, in other words, an air curtain is formed by the non-reactive gas blown out from the blowout port 53*a*1 of the first blowout part 53*a* to the air laminar flow (see short broken line arrows in FIG. 3A) from the upstream side in the conveyance direction toward the inside of the enclosure part 52.

In the image forming apparatus 1 illustrated in FIG. 1, the recording medium P conveyed from the sheet feeder 10 is placed on the conveyance surface 212 of the conveyance drum 211 in the conveyance unit 21. Then, the recording medium P placed on the conveyance surface 212 is conveyed to the head unit 40 by the rotation of the conveyance drum 211 in the R direction, and after an image is formed on the recording medium by the head unit 40, the recording medium P is conveyed to the irradiation device 50. During such conveyance of the recording medium P, an air laminar flow is generated with the rotation of the conveyance drum 211 in the R direction (the conveyance direction).

In the present embodiment, as described above, the first blowout part 53*a* is disposed at the end of the first plate member 52*a* on the upstream side in the conveyance direction, and the non-reactive gas is supplied into the enclosure part 52 from the upstream side of the first plate member 52*a* in the conveyance direction via the first blowout part 53*a*.

Therefore, the air laminar flow from the upstream side in the conveyance direction toward the inside of the enclosure part 52 is inhibited from entering by the non-reactive gas supplied into the enclosure part 52 from the upstream side of the first plate member 52*a* in the conveyance direction, and thus it is possible to prevent the entry of the air laminar flow into the enclosure part 52.

Furthermore, the flow rate of the air laminar flow generated with the rotation of the conveyance drum 211 increases as the rotation speed of the conveyance drum 211 increases (as the conveyance speed of the recording medium P increases), but in the present embodiment, it is possible to prevent the entry of the air laminar flow into the enclosure part 52 as described below.

FIG. 4A is a diagram showing measurement results of the concentration of a non-reactive gas in a conventional energy ray irradiation device. FIG. 4B is a diagram showing measurement results of the concentration of the non-reactive gas in the irradiation device 50 according to the present embodiment. Here, measurement is performed using nitrogen as an example of the non-reactive gas. Furthermore, in FIG. 4A, the conventional energy ray irradiation device is configured to supply nitrogen from the vicinity of the irradiator into the device (the irradiation area) as in JP 2012-217873 A.

In FIG. 4A and FIG. 4B, the conveyance speed of the recording medium P (the rotation speed of the conveyance drum 211) is set to three speeds of low, medium, and high. The low speed and the high speed are, for example, the minimum speed and the maximum speed of the conveyance speed of the recording medium P in the image forming apparatus 1 illustrated in FIG. 1, respectively, or speeds in the vicinity thereof, and the medium speed is, for example, a median value between the minimum speed and the maximum speed or speeds in the vicinity thereof. The concentration of nitrogen from the concentration of nitrogen in the atmosphere to a nitrogen concentration of 100% is divided into four concentration areas, that is, an atmospheric state, a low concentration, a medium concentration, and a high concentration from the low concentration of nitrogen, and the medium concentration or more is the concentration of nitrogen that does not affect the curing of the UV ink. Further, as illustrated in FIG. 3B, the concentration of nitrogen is measured at three points, that is, an upstream position, a middle position, and a downstream position in the enclosure part 52. Here, the supply amount of nitrogen is constant.

As illustrated in FIG. 4A, in the conventional energy ray irradiation device, a medium concentration of nitrogen can be ensured at the upstream position and a high concentration of nitrogen can be ensured at the middle and downstream positions at the low conveyance speed. On the other hand, at medium and high conveyance speeds, a medium concentration of nitrogen can be ensured at the downstream position, but it is the atmospheric state at the upstream position, and a low concentration of nitrogen is obtained at the middle position.

As described above, in the conventional energy ray irradiation device, the concentration of nitrogen decreases due to the entry of the air laminar flow at the upstream and middle positions at a medium conveyance speed or more, and the concentration of nitrogen is non-uniform inside the device.

On the other hand, as illustrated in FIG. 4B, in the irradiation device 50 of the present embodiment, a high concentration of nitrogen can be ensured at the upstream, middle, and downstream positions at low and medium conveyance speeds. In addition, even at a high conveyance speed, a medium concentration of nitrogen can be ensured at the upstream and middle positions and a high concentration of nitrogen can be ensured at the downstream position.

As described above, in the irradiation device 50 of the present embodiment, the concentration of nitrogen equal to or higher than a medium concentration can be ensured at the upstream, middle, and downstream positions at all the conveyance speeds, and the concentration of nitrogen is substantially uniform in the enclosure part 52.

That is, in the present embodiment, even if the conveyance speed of the recording medium P increases, it is possible to prevent the entry of the air laminar flow into the enclosure part 52 and stably ensure the concentration of nitrogen in the enclosure part 52. Furthermore, in the present embodiment, the concentration of nitrogen in the enclosure part 52 can be stably ensured without increasing the supply amount of nitrogen.

As described above, in the present embodiment, the irradiation device 50 includes the irradiator 51, the enclosure part 52, and the first blowout part 53*a*. The irradiator 51 faces the conveyance surface 212 and irradiates the UV ink on the recording medium P conveyed on the conveyance surface 212 with ultraviolet rays, which are energy rays. The enclosure part 52 includes a plate member surrounding the space between the irradiator 51 and the conveyance surface 212, and the plate member includes the first plate member 52*a* extending from the end of the irradiator 51 on the upstream side in the conveyance direction toward the conveyance surface 212 on the upstream side of the end. The first blowout part 53*a* supplies the non-reactive gas that does not react with the UV ink into the enclosure part 52 from the end of the first plate member 52*a* on the upstream side in the conveyance direction.

According to the present embodiment with such a configuration, in the irradiation device 50, the first blowout part 53*a* supplies the non-reactive gas into the enclosure part 52 from the end of the first plate member 52*a* on the upstream side in the conveyance direction. Therefore, the irradiation device 50 can block the air laminar flow that is generated with the rotation of the conveyance drum 211 and is about to enter the enclosure part 52 from the upstream side in the conveyance direction with the non-reactive gas supplied from the first blowout part 53*a*. As a result, the irradiation device 50 can prevent the entry of the air laminar flow into the enclosure part 52. In addition, as described with reference to FIG. 4B, the irradiation device 50 can prevent the entry of the air laminar flow into the enclosure part 52 even when the conveyance speed of the recording medium P increases.

As described above, since the irradiation device 50 can prevent the entry of the air laminar flow into the enclosure part 52, the concentration of the non-reactive gas in the enclosure part 52 can be stably ensured. Furthermore, the irradiation device 50 can stably ensure the concentration of the non-reactive gas in the enclosure part 52 without increasing the supply amount of the non-reactive gas. Therefore, in the present embodiment, it is not necessary to increase the size of the supply device 60 in order to increase the supply amount of the non-reactive gas, and the device cost can be suppressed.

As illustrated in FIG. 3A, the present embodiment is suitable in a case where the conveyance drum 211 (the conveyance surface 212) has a claw 213 that holds an end of the recording medium P between the conveyance surface 212 and the claw.

The claw 213 is disposed at a boundary position of a placement area of the recording medium P on the conveyance surface 212 (the outer circumferential surface of the conveyance drum 211). For example, in the example illustrated in FIG. 3A, the claws 213 are arranged at three positions on the conveyance surface 212 at intervals of 120° in the circumferential direction of the rotating shaft (not illustrated) of the conveyance drum 211.

Each of the claw 213 extends across the width of the conveyance unit 21 or includes a plurality of claws arranged along the width direction W of the conveyance unit 21. Although not illustrated, the conveyance drum 211 includes a drive mechanism that drives the claw 213 to approach and separate from the conveyance surface 212.

In a case where the recording medium P is held on the conveyance surface 212, the recording medium P is placed on the conveyance surface 212 in such a manner that the end of the recording medium P on the downstream side in the conveyance direction is positioned at the claw 213. There-after, the claw 213 is driven in a direction approaching the conveyance surface 212 by the drive mechanism, and the end of the recording medium P on the downstream side in the conveyance direction is sandwiched between the claw 213 and the conveyance surface 212. As a result, the conveyance drum 211 can hold the recording medium P on the conveyance surface 212.

In a case of releasing the holding of the recording medium P on the conveyance surface 212, the claw 213 is driven in a direction away from the conveyance surface 212 by the drive mechanism to release the end of the recording medium P on the downstream side in the conveyance direction sandwiched between the claw 213 and the conveyance surface 212. As a result, the conveyance drum 211 can release the holding of the recording medium P on the conveyance surface 212.

Since the claw 213 projects from the conveyance surface 212 even in a state of holding the recording medium P, the air laminar flow is easily generated with the rotation of the conveyance drum 211. Therefore, by using the irradiation device 50 with the configuration described above, it is possible to prevent the entry of the air laminar flow into the enclosure part 52 and to stably ensure the concentration of the non-reactive gas in the enclosure part 52.

First Modification

Figure 5A:
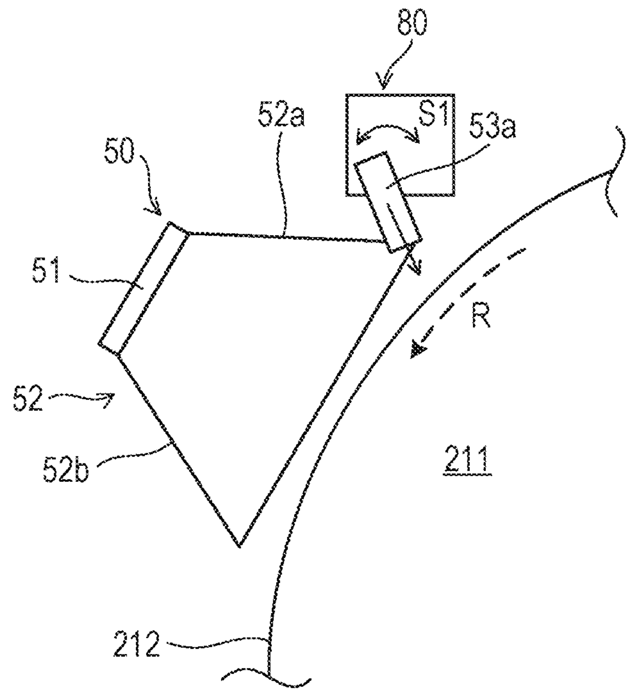
FIG. 5A is a diagram illustrating a first blowout part in which the supply direction of the non-reactive gas is adjustable as a first modification of the embodiment of the present invention and is a diagram illustrating the first blowout part in a case where a conveyance speed is low.
Figure 5B:
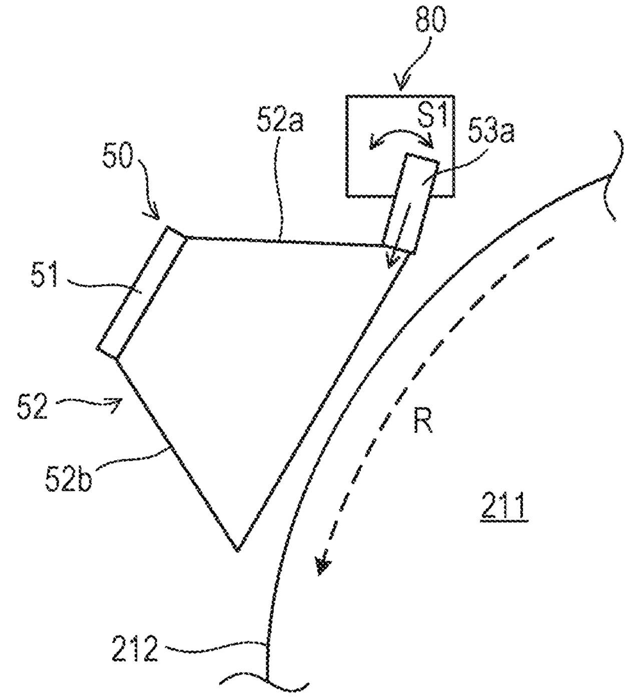
FIG. 5B is a diagram illustrating the first blowout part in which the supply direction of the non-reactive gas is adjustable as the first modification of the embodiment of the present invention and is a diagram illustrating the first blowout part in a case where the conveyance speed is high.

FIG. 5A is a diagram illustrating the first blowout part 53*a* in which the supply direction of a non-reactive gas is adjustable as a first modification of the present embodiment and is a diagram illustrating the first blowout part 53*a* in a case where the conveyance speed is low. FIG. 5B is a diagram illustrating the first blowout part 53*a* in which the supply direction of the non-reactive gas is adjustable as the first modification of the present embodiment and is a diagram illustrating the first blowout part 53*a* in a case where the conveyance speed is high.

In the present modification, the irradiation device 50 illustrated in FIG. 3A and FIG. 3B further includes a first adjuster 80 capable of adjusting the supply direction of the non-reactive gas supplied from the first blowout part 53*a* (see also FIG. 13A and FIG. 13B to be described later). Therefore, in FIG. 5A and FIG. 5B, the same reference numerals are given to the same configurations as those illustrated in FIG. 3A and FIG. 3B, and redundant description thereof will be omitted.

As illustrated in FIG. 5A and FIG. 5B, in the present modification, the irradiation device 50 includes the first adjuster 80 that adjusts the supply direction of the non-reactive gas supplied from the first blowout part 53*a*.

In the present modification, the first adjuster 80 is configured to swing the first blowout part 53*a* in a swing direction S1 with the direction along the width direction W of the conveyance unit 21 as a swing axis to adjust the supply direction of the non-reactive gas supplied from the first blowout part 53*a*. That is, the first adjuster 80 is configured to adjust the supply direction of the non-reactive gas supplied from the first blowout part 53*a* toward the conveyance surface 212. The configuration of the first adjuster 80 will be described later with reference to FIG. 13A and FIG. 13B.

The supply direction of the non-reactive gas supplied from the first blowout part 53*a* is adjusted based on the conveyance speed of the recording medium P. For example, the controller 100 acquires the conveyance speed of the recording medium P from the conveyance drive unit 111 (see FIG. 2) and controls the first adjuster 80 based on the acquired conveyance speed to adjust the supply direction of the non-reactive gas supplied from the first blowout part 53*a*.

In a case where the conveyance speed is low, as illustrated in FIG. 5A, the first adjuster 80 adjusts the supply direction of the non-reactive gas supplied from the first blowout part 53*a* to be an obtuse angle with respect to the conveyance surface 212 in a side view.

In a case where the conveyance speed is low, the flow rate of the air laminar flow generated with the rotation of the conveyance drum 211 is also relatively small. Therefore, the laminar flow of the non-reactive gas formed in the vicinity of the blowout port 53*a*1 of the first blowout part 53*a* can block the air laminar flow that is about to enter the enclosure part 52, even if the width of the laminar flow of the non-reactive gas in the conveyance direction is relatively short. Therefore, as illustrated in FIG. 5A, the first adjuster 80 adjusts the supply direction of the non-reactive gas supplied from the first blowout part 53*a* to be an obtuse angle with respect to the conveyance surface 212.

On the other hand, in a case where the conveyance speed is high, as illustrated in FIG. 5B, the first adjuster 80 adjusts the supply direction of the non-reactive gas supplied from the first blowout part 53*a* to be an acute angle with respect to the conveyance surface 212 in a side view.

In a case where the conveyance speed is high, the flow rate of the air laminar flow generated with the rotation of the conveyance drum 211 is also relatively large. Therefore, regarding the laminar flow of the non-reactive gas formed in the vicinity of the blowout port 53*a*1 of the first blowout part 53*a*, the laminar flow of the non-reactive gas with a larger width in the conveyance direction can block the air laminar flow that is about to enter the enclosure part 52. As a result, as illustrated in FIG. 5B, the first adjuster 80 adjusts the supply direction of the non-reactive gas supplied from the first blowout part 53*a* to be an acute angle with respect to the conveyance surface 212.

Even when the supply amount of the non-reactive gas is the same as that in the case illustrated in FIG. 5A, by adjusting the supply direction of the non-reactive gas supplied from the first blowout part 53*a* to be an acute angle with respect to the conveyance surface 212, it is possible to block the air laminar flow that is about to enter the enclosure part 52. Therefore, the supply amount of the non-reactive gas supplied from the first blowout part 53*a* may be, for example, a minimum constant supply amount capable of maintaining the concentration in the enclosure part 52 at a medium concentration or more.

As described above, by adjusting the supply direction of the non-reactive gas from the first blowout part 53*a* based on the conveyance speed of the recording medium P, even if the conveyance speed of the recording medium P increases, it is possible to further prevent the entry of the air laminar flow into the enclosure part 52. In addition, by adjusting the supply direction of the non-reactive gas from the first blowout part 53*a* based on the conveyance speed of the recording medium P, it is possible to further prevent the entry of the air laminar flow into the enclosure part 52 without increasing the supply amount of the non-reactive gas.

Second Modification

Figure 6:
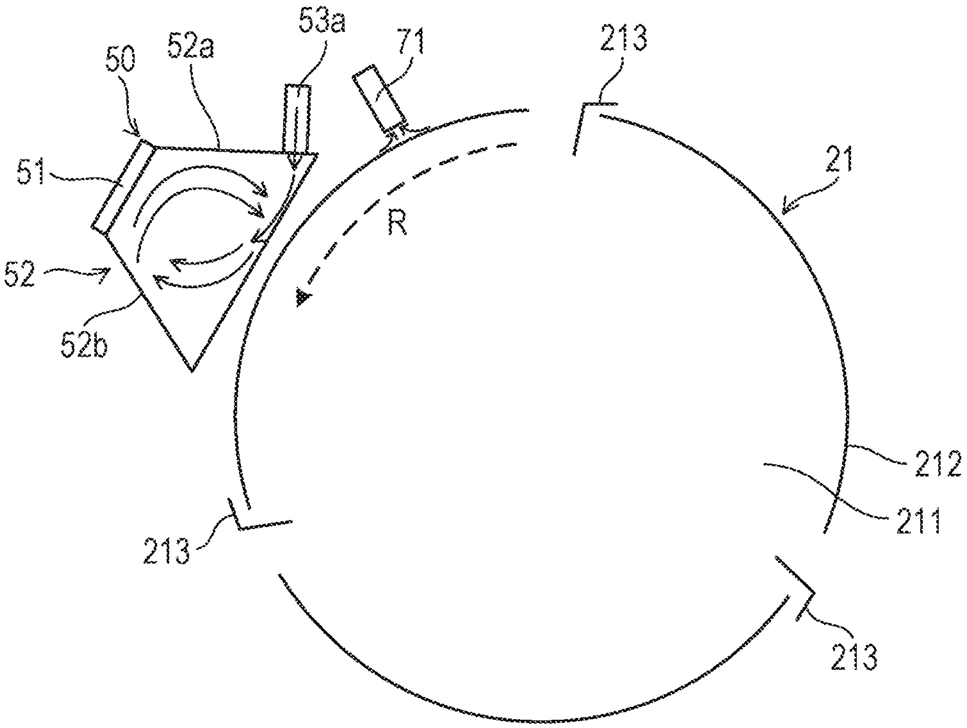
FIG. 6 is a diagram illustrating a configuration including a first suction part that sucks surrounding air as a second modification of the embodiment of the present invention.

FIG. 6 is a diagram illustrating a configuration including a first suction part 71 that sucks surrounding air as a second modification of the present embodiment.

In the present modification, the irradiation device 50 illustrated in FIG. 3A and FIG. 3B further includes the first suction part 71 that sucks surrounding air. Therefore, in FIG. 6, the same reference numerals are given to the same configurations as those illustrated in FIG. 3A and FIG. 3B, and redundant description thereof will be omitted.

As illustrated in FIG. 6, in the present modification, the irradiation device 50 includes the first suction part 71 that sucks surrounding air on the upstream side of the enclosure part 52 in the conveyance direction. The first suction part 71 is, for example, a duct having a suction fan controlled by the controller 100, and the suction fan may be provided in the duct or at an end of the duct.

In the present modification, the first suction part 71 extends across the width of the conveyance unit 21 and is disposed in the vicinity of the enclosure part 52 and on the upstream side of the enclosure part 52 in the conveyance direction. Then, the first suction part 71 sucks surrounding air on the upstream side of the enclosure part 52 in the conveyance direction.

As described above, since the surrounding air is sucked by the first suction part 71 on the upstream side of the enclosure part 52 in the conveyance direction, it is possible to break the air laminar flow generated with the rotation of the conveyance drum 211 (disturb the flow of the air laminar flow). As a result, it is possible to further prevent the entry of the air laminar flow into the enclosure part 52.

The suction port of the first suction part 71 is desirably disposed close to the conveyance surface 212 in a manner not affecting the conveyance of the recording medium P so as to suck the air laminar flow generated with the rotation of the conveyance drum 211.

Third Modification

Figure 7:
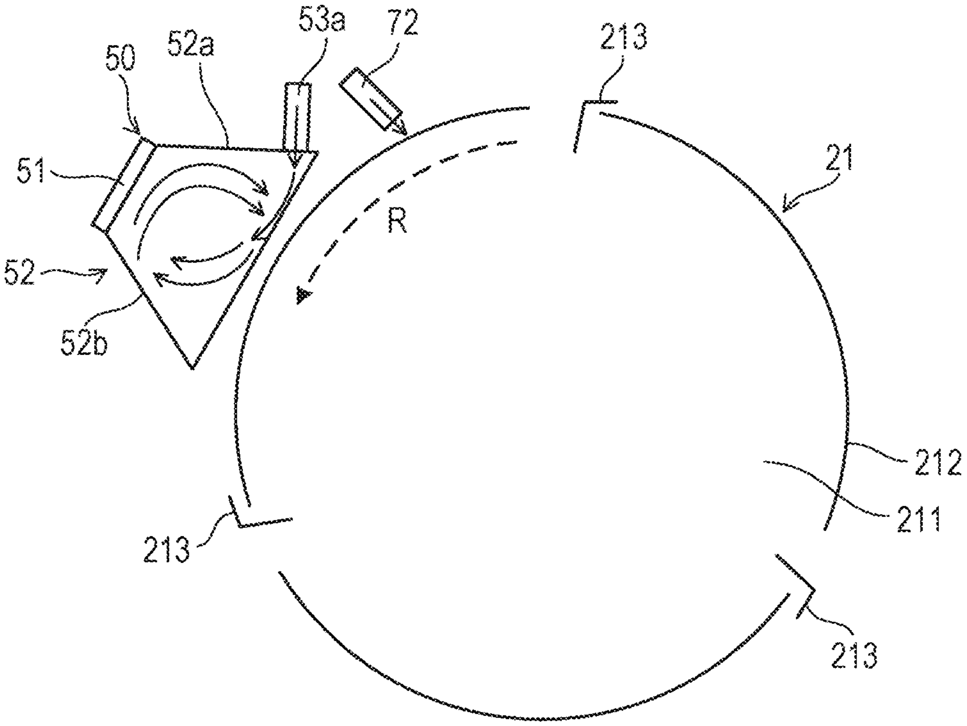
FIG. 7 is a diagram illustrating a configuration including an ejector that ejects air as a third modification of the embodiment of the present invention.

FIG. 7 is a diagram illustrating a configuration including an ejector 72 that ejects air as a third modification of the present embodiment.

In the present modification, the irradiation device 50 illustrated in FIG. 3A and FIG. 3B further includes the ejector 72 that ejects air toward the upstream side in the conveyance direction. Therefore, in FIG. 7, the same reference numerals are given to the same configurations as those illustrated in FIG. 3A and FIG. 3B, and redundant description thereof will be omitted.

As illustrated in FIG. 7, in the present modification, the irradiation device 50 includes the ejector 72 that ejects air toward the upstream side in the conveyance direction on the upstream side of the enclosure part 52 in the conveyance direction. The ejector 72 is, for example, a duct having a blower controlled by the controller 100, and the blower may be provided in the duct or at an end of the duct.

In the present modification, the ejector 72 extends across the width of the conveyance unit 21 and is disposed in the vicinity of the enclosure part 52 and on the upstream side of the enclosure part 52 in the conveyance direction. The ejector 72 ejects air toward the upstream side in the conveyance direction on the upstream side of the enclosure part 52 in the conveyance direction. That is, the ejector 72 ejects air toward the upstream side in the conveyance direction in such a manner that the ejected air faces the air laminar flow generated with the rotation of the conveyance drum 211.

As described above, since the air is ejected toward the upstream side in the conveyance direction by the ejector 72 on the upstream side of the enclosure part 52 in the conveyance direction, it is possible to break the air laminar flow generated with the rotation of the conveyance drum 211 (disturb the flow of the air laminar flow). As a result, it is possible to further prevent the entry of the air laminar flow into the enclosure part 52.

The ejection port of the ejector 72 is desirably disposed close to the conveyance surface 212 in a manner not affecting the conveyance of the recording medium P so as to be able to break the air laminar flow generated with the rotation of the conveyance drum 211.

Fourth Modification

Figure 8A:
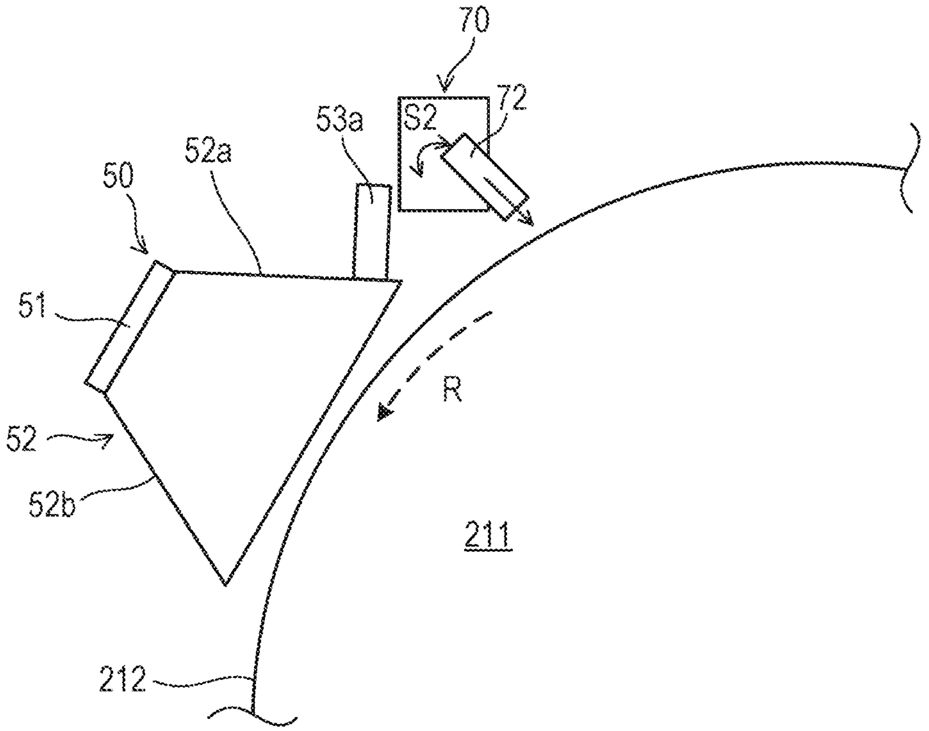
FIG. 8A is a diagram illustrating an ejector in which the ejection direction of air is adjustable as a fourth modification of the embodiment of the present invention and is a diagram illustrating the ejector in a case where the conveyance speed is low.
Figure 8B:
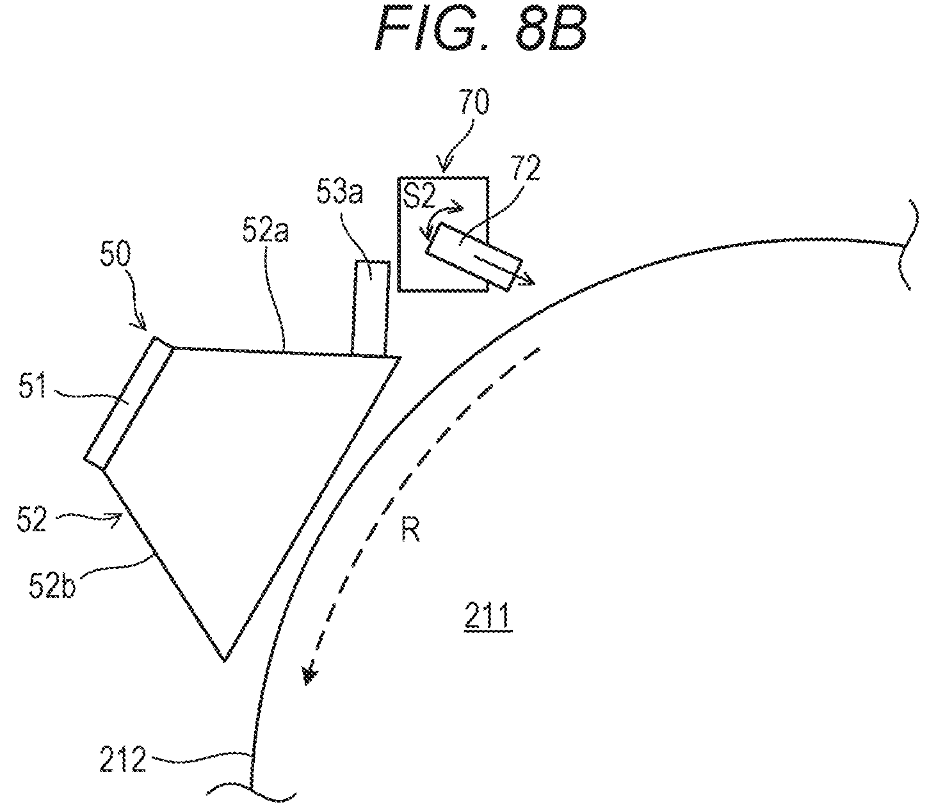
FIG. 8B is a diagram illustrating the ejector in which the ejection direction of air is adjustable as the fourth modification of the embodiment of the present invention and is a diagram illustrating the ejector in a case where the conveyance speed is high.

FIG. 8A is a diagram illustrating the ejector 72 in which the ejection direction of air is adjustable as a fourth modification of the present embodiment and is a diagram illustrating the ejector 72 in a case where the conveyance speed is low. FIG. 8B is a diagram illustrating the ejector 72 in which the ejection direction of air is adjustable as the fourth modification of the present embodiment and is a diagram illustrating the ejector 72 in a case where the conveyance speed is high.

In the present modification, the irradiation device 50 illustrated in FIG. 3A and FIG. 3B further includes a second adjuster 70 that adjusts the ejection direction of air ejected from the ejector 72. That is, in the third modification, the ejection direction of air ejected from the ejector 72 is adjustable by the second adjuster 70. Therefore, in FIG. 8A and FIG. 8B, the same reference numerals are given to the same configurations as those illustrated in FIGS. 3A, FIG. 3B, and FIG. 7, and redundant description thereof will be omitted.

As illustrated in FIG. 8A and FIG. 8B, in the present modification, the irradiation device 50 includes the second adjuster 70 that adjusts the ejection direction of air ejected from the ejector 72.

In the present modification, the second adjuster 70 is configured to swing the ejector 72 in a swing direction S2 with the direction along the width direction W of the conveyance unit 21 as a swing axis to adjust the ejection direction of air ejected from the ejector 72. That is, the second adjuster 70 is configured to adjust the ejection direction of air ejected from the ejector 72 toward the conveyance surface 212. As an example, the configuration of the second adjuster 70 may be equivalent to that of the first adjuster 80 to be described later with reference to FIG. 13A and FIG. 13B.

The ejection direction of air ejected from the ejector 72 is adjusted based on the conveyance speed of the recording medium P. For example, the controller 100 acquires the conveyance speed of the recording medium P from the conveyance drive unit 111 (see FIG. 2) and controls the second adjuster 70 based on the acquired conveyance speed to adjust the ejection direction of air ejected from the ejector 72.

In a case where the conveyance speed is low, as illustrated in FIG. 8A, the second adjuster 70 adjusts the ejection direction of air ejected from the ejector 72 to be an obtuse angle with respect to the conveyance surface 212 in a side view.

In a case where the conveyance speed is low, the flow rate of the air laminar flow generated with the rotation of the conveyance drum 211 is also relatively small. Therefore, the counter air laminar flow formed in the vicinity of the ejection port of the ejector 72 can break the air laminar flow that is about to enter the enclosure part 52, even when the flow rate of the counter air laminar flow in the direction opposite to the air laminar flow generated with the rotation of the conveyance drum 211 is relatively small. Therefore, as illustrated in FIG. 8A, the second adjuster 70 adjusts the ejection direction of air ejected from the ejector 72 to be an obtuse angle with respect to the conveyance surface 212.

On the other hand, in a case where the conveyance speed is high, as illustrated in FIG. 8B, the second adjuster 70 adjusts the ejection direction of air ejected from the ejector 72 to be an acute angle with respect to the conveyance surface 212 in a side view.

In a case where the conveyance speed is high, the flow rate of the air laminar flow generated with the rotation of the conveyance drum 211 is also relatively large. Therefore, when the flow rate of the counter air laminar flow in the direction opposite to the air laminar flow generated with the rotation of the conveyance drum 211 is relatively large, the counter air laminar flow formed in the vicinity of the ejection port of the ejector 72 can break the air laminar flow that is about to enter the enclosure part 52. Therefore, as illustrated in FIG. 8B, the second adjuster 70 adjusts the ejection direction of air ejected from the ejector 72 to be an acute angle with respect to the conveyance surface 212.

By adjusting the ejection direction of air ejected from the ejector 72 to be an acute angle with respect to the conveyance surface 212 even with the same ejection amount of air as that in the case of FIG. 8A, it is possible to break the air laminar flow that is about to enter the enclosure part 52. Therefore, the ejection amount of air ejected from the ejector 72 may be constant.

As described above, by adjusting the supply direction of air from the ejector 72 based on the conveyance speed of the recording medium P, even if the conveyance speed of the recording medium P increases, it is possible to further prevent the entry of the air laminar flow into the enclosure part 52. In addition, by adjusting the ejection direction of air from the ejector 72 based on the conveyance speed of the recording medium P, it is possible to further prevent the entry of the air laminar flow into the enclosure part 52 without increasing the ejection amount of air.

The head unit 40 is disposed on the upstream side of the irradiation device 50 in the conveyance direction. Therefore, in a case where the ejection direction of air ejected from the ejector 72 is adjusted to be an acute angle with respect to the conveyance surface 212, the ejection direction of air from the ejector 72 is adjusted so as not to affect image formation in the head unit 40.

Furthermore, the ejection amount of air from the ejector 72 may be adjusted based on the conveyance speed of the recording medium P so as not to affect image formation in the head unit 40. For example, the controller 100 acquires the conveyance speed of the recording medium P from the conveyance drive unit 111 (see FIG. 2) and adjusts the ejection direction of air ejected from the ejector 72 based on the acquired conveyance speed.

Fifth Modification

Figure 9:
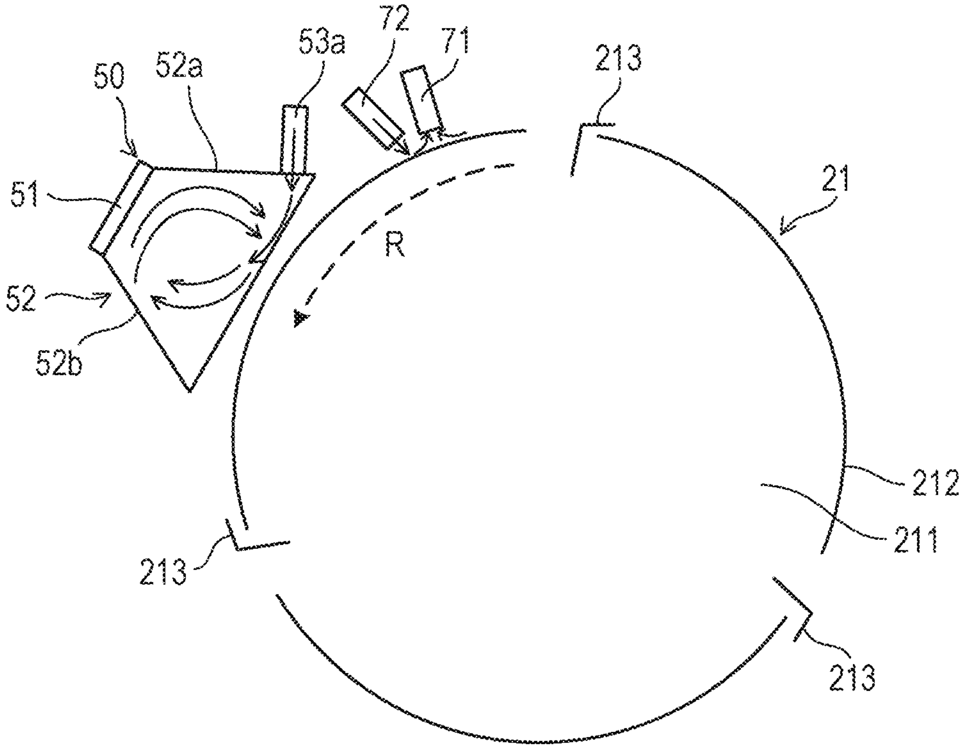
FIG. 9 is a diagram illustrating a configuration including the first suction part that sucks surrounding air and the ejector that ejects air as a fifth modification of the embodiment of the present invention.

FIG. 9 is a diagram illustrating a configuration including the first suction part 71 that sucks surrounding air and the ejector 72 that ejects air as a fifth modification of the present embodiment.

In the present modification, the irradiation device 50 illustrated in FIG. 3A and FIG. 3B further includes the first suction part 71 that sucks surrounding air and the ejector 72 that ejects air toward the upstream side in the conveyance direction. That is, the second modification and the third modification are combined. Therefore, in FIG. 9, the same reference numerals are given to the same configurations as those illustrated in FIGS. 3A, FIG. 3B, FIG. 6, and FIG. 7, and redundant description thereof will be omitted.

As illustrated in FIG. 9, in the present modification, the irradiation device 50 includes the first suction part 71 that sucks surrounding air and the ejector 72 that jets air toward the upstream side in the conveyance direction on the upstream side of the enclosure part 52 in the conveyance direction.

The first suction part 71 and the ejector 72 have been described in the second modification and the third modification. In FIG. 9, as an example, the first suction part 71 is disposed on the upstream side of the ejector 72 in the conveyance direction, but conversely, the ejector 72 may be disposed on the upstream side of the first suction part 71 in the conveyance direction. Here, in consideration of the influence on the head unit 40 disposed on the upstream side of the first suction part 71 and the ejector 72 in the conveyance direction, it is desirable to dispose the first suction part 71 on the upstream side of the ejector 72 in the conveyance direction as illustrated in FIG. 9.

In this manner, on the upstream side of the enclosure part 52 in the conveyance direction, the surrounding air is sucked by the first suction part 71 and the air is ejected by the ejector 72 toward the upstream side in the conveyance direction. Therefore, the first suction part 71 and the ejector 72 can break the air laminar flow generated with the rotation of the conveyance drum 211 (disturb the flow of the air laminar flow). As a result, it is possible to further prevent the entry of the air laminar flow into the enclosure part 52.

In addition, as in the present modification, in a case where the irradiation device 50 includes the first suction part 71 that sucks surrounding air and the ejector 72 that ejects air, it is desirable to adjust the ratio between the suction amount at which the first suction part 71 sucks air and the ejection amount at which the ejector 72 ejects air.

In this case, for example, the controller 100 adjusts the suction amount of air sucked by the first suction part 71 by controlling the suction fan and adjusts the ejection amount of air ejected by the ejector 72 by controlling the blower fan.

FIG. 10 is a diagram showing measurement results of the concentration of the non-reactive gas in the irradiation device 50 for the ratio between the suction amount at which the first suction part 71 sucks air and the ejection amount at which the ejector 72 ejects air. Here, measurement is performed using nitrogen as an example of the non-reactive gas.

As shown in FIG. 10, in a case where the ratio between the suction amount of air sucked by the first suction part 71 and the ejection amount of air ejected by the ejector 72 is 2:1, a high concentration of nitrogen can be ensured in the enclosure part 52 of the irradiation device 50. Therefore, the controller 100 desirably controls the suction amount and the ejection amount in such a manner that the ratio between the suction amount of air sucked by the first suction part 71 and the ejection amount of air ejected by the ejector 72 is 2:1.

Even in a case where the ratio between the suction amount of air sucked by the first suction part 71 and the ejection amount of air ejected by the ejector 72 is 1:1 (=2:2, 3:3) and 4:3, a medium concentration of nitrogen can be ensured in the enclosure part 52 of the irradiation device 50. Therefore, the controller 100 may adjust the suction amount and the ejection amount in such a manner that the ratio between the suction amount of air sucked by the first suction part 71 and the ejection amount of air ejected by the ejector 72 is 1:1 to 4:3.

By adjusting the ratio between the suction amount at which the first suction part 71 sucks air and the ejection amount at which the ejector 72 ejects air in this manner, it is possible to prevent the entry of the air laminar flow into the enclosure part 52 and to ensure a medium or more concentration of nitrogen in the enclosure part 52.

Figure 11:
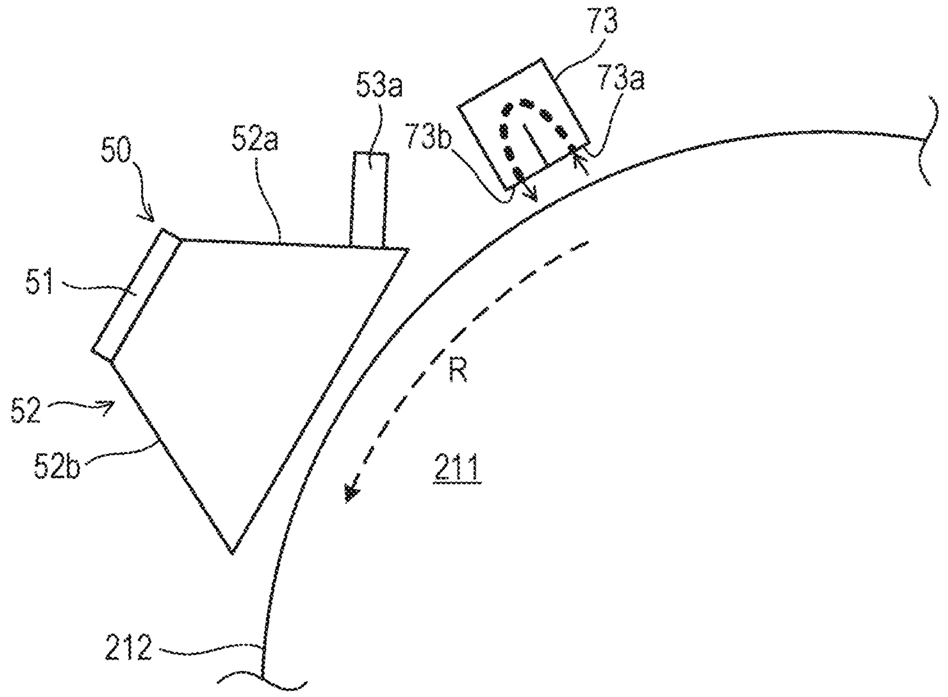
FIG. 11 is a diagram illustrating a configuration in which a suction-ejector 73 that sucks surrounding air and ejects the sucked air is disposed instead of the first suction part and the ejector illustrated in FIG. 9.

FIG. 11 is a diagram illustrating a configuration in which a suction-ejector 73 that sucks surrounding air and ejects the sucked air is disposed instead of the first suction part 71 and the ejector 72 illustrated in FIG. 9.

As illustrated in FIG. 11, the irradiation device 50 includes the suction-ejector 73 that sucks surrounding air and ejects the sucked air toward the upstream side in the conveyance direction on the upstream side of the enclosure part 52 in the conveyance direction. The suction-ejector 73 is configured by integrating the first suction part 71 and the ejector 72 described above. The suction-ejector 73 includes, for example, a fan controlled by the controller 100 therein, and is configured that the fan sucks air from a suction port 73*a* and ejects the sucked air from an ejection port 73*b*.

The suction-ejector 73 extends across the width of the conveyance unit 21 and is disposed in the vicinity of the enclosure part 52 and on the upstream side of the enclosure part 52 in the conveyance direction. The suction-ejector 73 sucks surrounding air and ejects the sucked air toward the upstream side in the conveyance direction on the upstream side of the enclosure part 52 in the conveyance direction.

Either the suction port 73*a* or the ejection port 73*b* may be on the upstream side in the conveyance direction, but as described with reference to FIG. 9, in consideration of the influence on the head unit 40 disposed on the upstream side of the suction-ejector 73 in the conveyance direction, it is desirable to dispose the suction port 73*a* on the upstream side of the ejection port 73*b* in the conveyance direction. In the example illustrated in FIG. 11, the suction port 73*a* is disposed on the upstream side of the ejection port 73*b* in the conveyance direction, and the suction-ejector 73 ejects air sucked on the downstream side of the position of the suction port 73*a* that sucks air in the conveyance direction from the ejection port 73*b*.

As described above, on the upstream side of the enclosure part 52 in the conveyance direction, the suction-ejector 73 sucks surrounding air and ejects air toward the upstream side in the conveyance direction. Therefore, the suction-ejector 73 can break the air laminar flow generated with the rotation of the conveyance drum 211 (disturb the flow of the air laminar flow). As a result, it is possible to further prevent the entry of the air laminar flow into the enclosure part 52.

In addition, since the suction-ejector 73 has a configuration in which the first suction part 71 and the ejector 72 illustrated in FIG. 9 are integrated, the number of parts can be reduced, and the space required for installation can also be reduced.

The suction port 73*a* and the ejection port 73*b* of the suction-ejector 73 are desirably disposed close to the conveyance surface 212 in a manner not affecting the conveyance of the recording medium P so as to be able to break the air laminar flow generated with the rotation of the conveyance drum 211.

Also in the suction-ejector 73, as described with reference to FIG. 10, the ratio between the suction amount at which air is sucked and the ejection amount at which air is ejected may be adjusted. In this case, for example, in order to adjust the ejection amount to be smaller than the suction amount, a discharge port for discharging excess air sucked to a place away from the conveyance surface 212 is provided, or in order to adjust the ejection amount to be larger than the suction amount, another suction port for sucking air from a place away from the conveyance surface 212 is provided.

Sixth Modification

Figure 12:
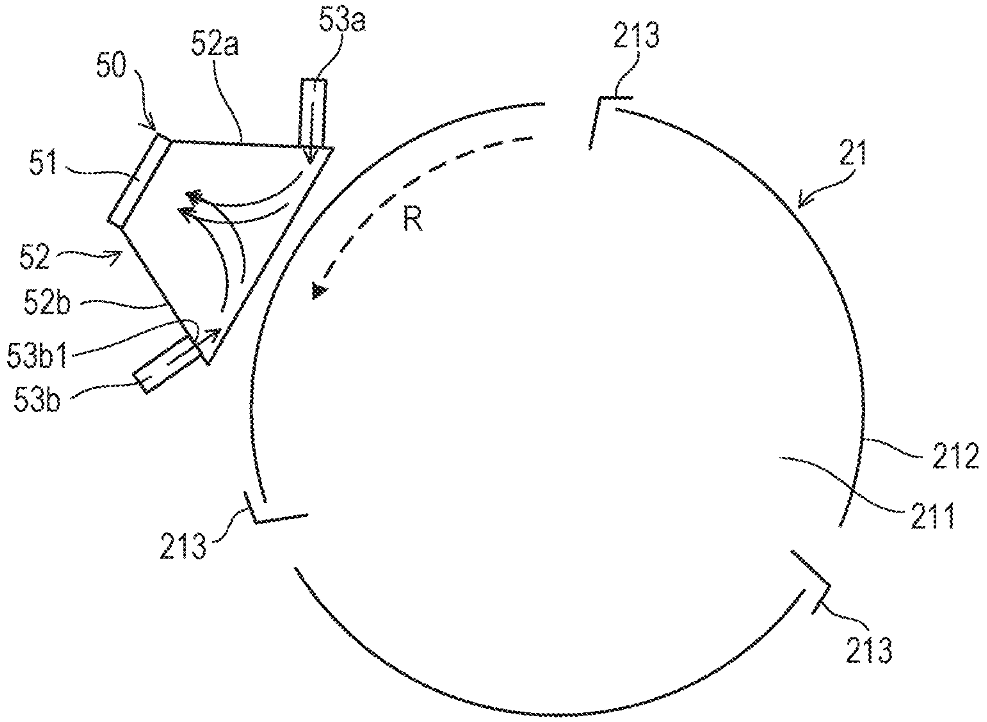
FIG. 12 is a diagram illustrating a configuration including a second blowout part that blows out the non-reactive gas as a sixth modification of the embodiment of the present invention.

FIG. 12 is a diagram illustrating a configuration including a second blowout part 53*b* that blows out a non-reactive gas as a sixth modification of the present embodiment.

In the present modification, the irradiation device 50 illustrated in FIG. 3A and FIG. 3B further includes the second blowout part 53*b* that blows out the non-reactive gas. Therefore, in FIG. 12, the same reference numerals are given to the same configurations as those illustrated in FIG. 3A and FIG. 3B, and redundant description thereof will be omitted.

As illustrated in FIG. 12, in the present modification, the irradiation device 50 includes the second blowout part 53*b* that supplies the non-reactive gas into the enclosure part 52 from the end of the second plate member 52*b* on the downstream side in the conveyance direction.

In the present modification, the second blowout part 53*b* is disposed at the end of the second plate member 52*b* on the downstream side in the conveyance direction. The second blowout part 53*b* is connected to the supply device 60, and the non-reactive gas supplied from the supply device 60 is supplied into the enclosure part 52 from the end of the second plate member 52*b* on the downstream side in the conveyance direction via the second blowout part 53*b*.

In addition, the second blowout part 53*b* is configured to blow out the non-reactive gas across the width of the irradiator 51. For example, a blowout port 53*b*1 of the second blowout part 53*b* extends across the width of the irradiator 51. A large number of blowout ports 53*b*1 may be provided along the width of the irradiator 51 to blow out the non-reactive gas across the width of the irradiator 51.

In this manner, an air curtain is formed by a non-reactive gas, in other words, an air curtain is formed by the non-reactive gas blown out from the blowout port 53*b*1 of the second blowout part 53*b*.

As described above, the air curtain made of the non-reactive gas is formed on the downstream side of the enclosure part 52 in the conveyance direction. Therefore, the non-reactive gas supplied from the first blowout part 53*a* and the second blowout part 53*b* is kept in the enclosure part 52, and the concentration of the non-reactive gas in the enclosure part 52 can be maintained.

In addition, the present modification is suitable in a case where the second plate member 52*b* extends from the end of the irradiator 51 on the downstream side in the conveyance direction toward the conveyance surface 212 on the downstream side of the end to increase the irradiation area of the irradiator 51. In the case of increasing the irradiation area of the irradiator 51 as described above, the concentration of the non-reactive gas may decrease on the downstream side of the enclosure part 52 only with the supply amount of the non-reactive gas blown out from the first blowout part 53*a* on the upstream side. As in the present modification, the second blowout part 53*b* supplies the non-reactive gas into the enclosure part 52 from the end of the second plate member 52*b* on the downstream side in the conveyance direction, so that it is possible to prevent a decrease in the concentration of the non-reactive gas on the downstream side of the enclosure part 52.

Seventh Modification

Figure 13A:
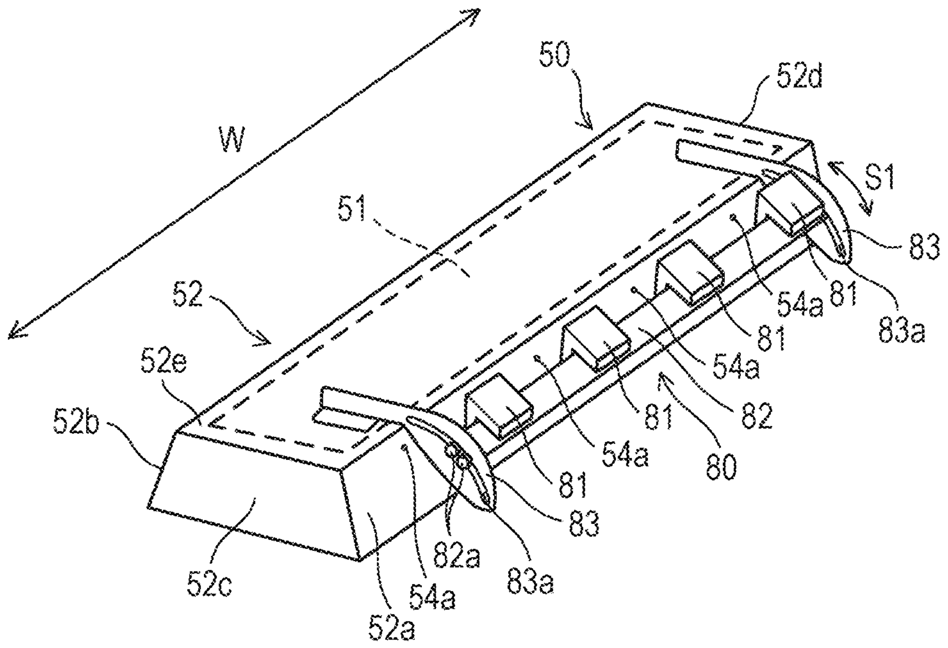
FIG. 13A is a diagram illustrating a configuration including a discharge hole for discharging the non-reactive gas as a seventh modification of the embodiment of the present invention and is a perspective view of the energy ray irradiation device as viewed from an upstream side in a conveyance direction.

FIG. 13A is a diagram illustrating a configuration including a first discharge hole 54*a* and a second discharge hole

54*b* for discharging a non-reactive gas as a seventh modification of the present embodiment and is a perspective view of the irradiation device 50 as viewed from the upstream side in the conveyance direction. FIG. 13B is a diagram illustrating the configuration including the first discharge hole 54*a* and the second discharge hole 54*b* for discharging the non-reactive gas as the seventh modification of the present embodiment and is a perspective view of the irradiation device 50 as viewed from the downstream side in the conveyance direction.

In the present modification, the irradiation device 50 illustrated in FIG. 3A and FIG. 3B further includes the first discharge hole 54*a* and the second discharge hole 54*b* for discharging the non-reactive gas. Therefore, in FIG. 13A and FIG. 13B, the same reference numerals are given to the same configurations as those illustrated in FIG. 3A and FIG. 3B, and redundant description thereof will be omitted.

As illustrated in FIG. 13A, in the present modification, the enclosure part 52 includes the first discharge hole 54*a* that discharges the non-reactive gas in the enclosure part 52 to the outside of the enclosure part 52. As the first discharge hole 54*a*, a plurality of through-holes are provided in the first plate member 52*a* along the width direction W of the conveyance unit 21.

The first discharge hole 54*a* discharges the non-reactive gas in the enclosure part 52 to prevent heat from remaining in the enclosure part 52. Therefore, it is desirable to provide the first discharge hole 54*a* at a position on a vertically upper side where the non-reactive gas with heat remains in the first plate member 52*a*. By providing the first discharge hole 54*a* at such a position, the non-reactive gas with heat can be discharged from the inside of the enclosure part 52 to the outside of the enclosure part 52, and heat can be prevented from remaining in the enclosure part 52.

Figure 13B:
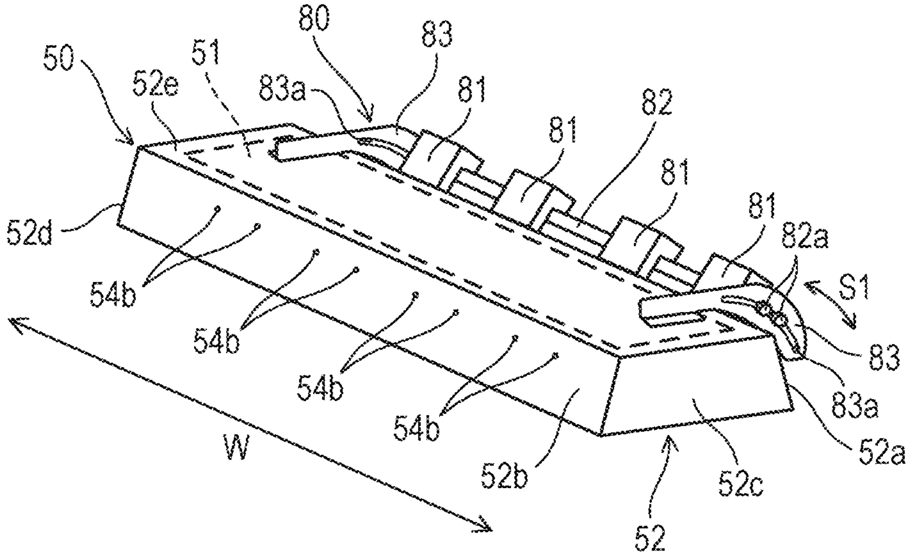
FIG. 13B is a diagram illustrating the configuration including the discharge hole for discharging the non-reactive gas as the seventh modification of the embodiment of the present invention and is a perspective view of the energy ray irradiation device as viewed from a downstream side in the conveyance direction.

Furthermore, as illustrated in FIG. 13B, in the present modification, the enclosure part 52 includes the second discharge hole 54*b* that discharges the non-reactive gas in the enclosure part 52 to the outside of the enclosure part 52. As the second discharge hole 54*b*, a plurality of through-holes are provided in the second plate member 52*b* along the width direction W of the conveyance unit 21.

The second discharge hole 54*b* also discharges the non-reactive gas in the enclosure part 52 to prevent heat from remaining in the enclosure part 52. Therefore, it is desirable to provide the second discharge hole 54*b* at a position on the vertically upper side where the non-reactive gas with heat remains in the second plate member 52*b*. By providing the second discharge hole 54*b* at such a position, the non-reactive gas with heat can be discharged from the inside of the enclosure part 52 to the outside of the enclosure part 52, and heat can be prevented from remaining in the enclosure part 52.

As described above, since the enclosure part 52 includes the first discharge hole 54*a* and the second discharge hole 54*b* that discharge the non-reactive gas from the inside of the enclosure part 52, the non-reactive gas with heat can be discharged from the inside of the enclosure part 52 to the outside of the enclosure part 52, and heat can be prevented from remaining in the enclosure part 52. The enclosure part 52 may have one of the first discharge hole 54*a* and the second discharge hole 54*b*.

The non-reactive gas discharged from the first discharge hole 54*a* and the second discharge hole 54*b* may be discharged to a safe place using, for example, a discharge duct. In addition, a recovery mechanism that recovers the non-reactive gas discharged from the first discharge hole 54*a* and the second discharge hole 54*b* may be provided, and the recovered non-reactive gas may be cooled, returned to the supply device 60, and re-supplied to the enclosure part 52. As a result, the non-reactive gas is prevented from overflowing to the surroundings of the irradiation device 50, and the safety of an operator can be ensured. In addition, in a case where the discharged non-reactive gas is recovered and resupplied, the amount of the non-reactive gas used can be reduced, and the cost of using the non-reactive gas can be reduced.

Here, the configuration of the first adjuster 80 will be described with reference to FIG. 13A and FIG. 13B.

As illustrated in FIG. 13A and FIG. 13B, the first adjuster 80 includes a supply connector 81, a support member 82 having a guide pin 82*a*, a holding member 83 having a guide groove 83*a*, and the like.

The supply connector 81 is a portion to which a supply tube (not illustrated) from the supply device 60 is connected. A plurality of the supply connectors 81 are arranged along the width direction W, and the first blowout part 53*a* is connected to the side of the enclosure part 52 of the plurality of supply connectors 81 so as to be movable together with the plurality of supply connectors 81. By supplying the non-reactive gas from the supply device 60 to the first blowout part 53*a* via the plurality of supply connectors 81, the non-reactive gas is uniformly blown out from the first blowout part 53*a* in the width direction W.

The support member 82 is a member that movably supports the plurality of supply connectors 81. The support member 82 extends in the width direction W and has the guide pins 82*a* at both ends in the width direction W.

The holding member 83 is a member that holds both ends of the support member 82. The holding member 83 is disposed on both end sides of the enclosure part 52 in the width direction W.

Specifically, one end of the holding member 83 is attached to a top plate 52*e* of the enclosure part 52, the other end extends from the top plate 52*e* to the upstream side in the conveyance direction, and the guide groove 83*a* is formed in the extending portion. The guide groove 83*a* is formed along the swing direction S1 and slidably holds the guide pin 82*a*. With such a configuration, the holding member 83 movably holds both ends of the support member 82.

Although not illustrated, the first adjuster 80 includes a drive device such as an actuator that swings the support member 82 along the swing direction S1. The drive device swings the support member 82 on the basis of a control signal from the controller 100 to adjust the supply direction of the non-reactive gas supplied from the first blowout part 53*a*.

The support member 82 is not limited to the drive device described above, and the operator may move the support member. In this case, the operator moves the support member 82 to a position corresponding to a conveyance speed on the basis of the conveyance speed of the recording medium P and fixes the support member 82 to the side of the holding member 83 using a screw or the like instead of the guide pin 82*a*. In this manner, the supply direction of the non-reactive gas supplied from the first blowout part 53*a* is adjusted.

Eighth Modification

Figure 14:
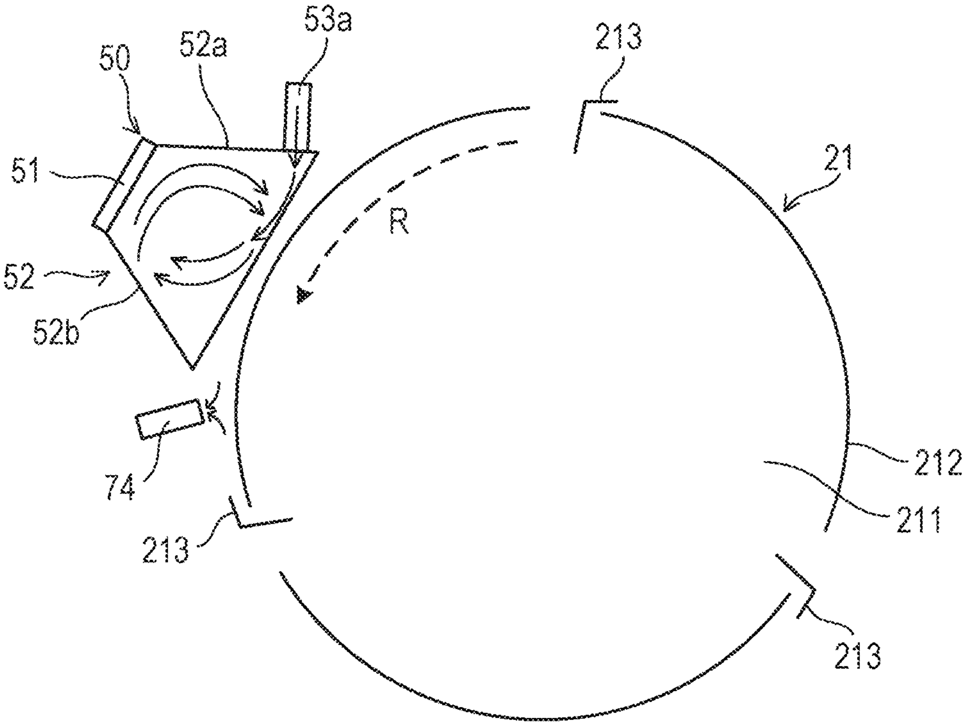
FIG. 14 is a diagram illustrating a configuration including a second suction part that sucks surrounding air as an eighth modification of the embodiment of the present invention.

FIG. 14 is a diagram illustrating a configuration including a second suction part 74 that sucks surrounding air as an eighth modification of the present embodiment.

In the present modification, the irradiation device 50 illustrated in FIG. 3A and FIG. 3B further includes the second suction part 74 that sucks surrounding air. Therefore, in FIG. 14, the same reference numerals are given to the same configurations as those illustrated in FIG. 3A and FIG. 3B, and redundant description thereof will be omitted.

As illustrated in FIG. 14, in the present modification, the irradiation device 50 includes the second suction part 74 that sucks surrounding air on the downstream side of the enclosure part 52 in the conveyance direction. The second suction part 74 is, for example, a duct having a suction fan controlled by the controller 100, and the suction fan may be provided in the duct or at an end of the duct.

In the present modification, the second suction part 74 extends across the width of the conveyance unit 21 and is disposed in the vicinity of the enclosure part 52 and on the downstream side of the enclosure part 52 in the conveyance direction. Then, the second suction part 74 sucks surrounding air on the downstream side of the enclosure part 52 in the conveyance direction.

As described above, since the surrounding air is sucked by the second suction part 74 on the downstream side of the enclosure part 52 in the conveyance direction, the non-reactive gas leaking from the downstream side of the enclosure part 52 in the conveyance direction can be sucked together with the surrounding air. The air containing the non-reactive gas sucked by the second suction part 74 is discharged to a safe place using, for example, a discharge duct. As a result, the non-reactive gas is prevented from overflowing to the surroundings of the irradiation device 50, and the safety of an operator can be ensured.

Ninth Modification

Figure 15:
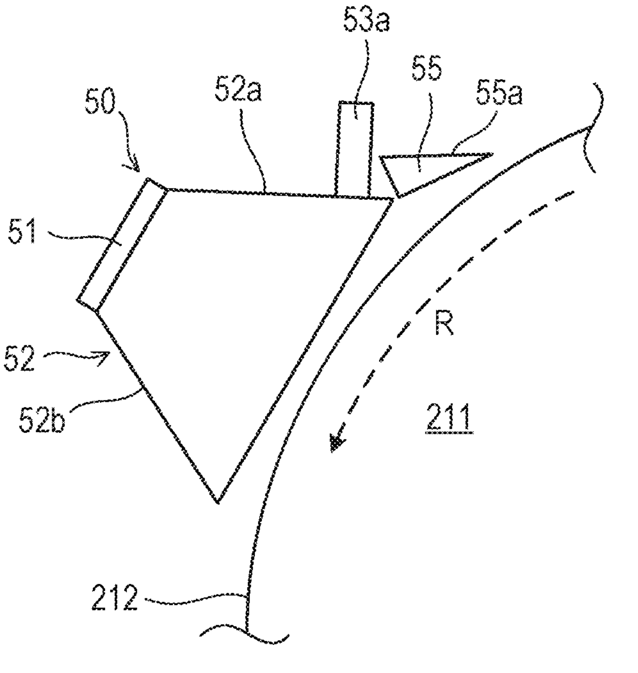
FIG. 15 is a diagram illustrating a configuration including a first guide member that guides an air laminar flow in a direction away from a conveyance surface as a ninth modification of the embodiment of the present invention.

FIG. 15 is a diagram illustrating a configuration including a first guide member 55 that guides an air laminar flow in a direction away from the conveyance surface 212 as a ninth modification of the present embodiment.

In the present modification, the irradiation device 50 illustrated in FIG. 3A and FIG. 3B further includes the first guide member 55 that guides the air laminar flow in the direction away from the conveyance surface 212. Therefore, in FIG. 15, the same reference numerals are given to the same configurations as those illustrated in FIG. 3A and FIG. 3B, and redundant description thereof will be omitted.

As illustrated in FIG. 15, in the present modification, the irradiation device 50 includes the first guide member 55 that guides the air laminar flow in a direction away from the conveyance surface 212 on the upstream side of the enclosure part 52 in the conveyance direction.

In the present modification, the first guide member 55 extends across the width of the conveyance unit 21 and is disposed in the vicinity of the enclosure part 52 and on the upstream side of the enclosure part 52 in the conveyance direction. The first guide member 55 may be a member that has any shape as long as it has an inclined portion 55*a* that guides the air laminar flow directed from the upstream side in the conveyance direction toward the inside of the enclosure part 52 in the direction away from the conveyance surface 212. In FIG. 15, as an example, the first guide member 55 is a member with a triangular shape in a side view. However, for example, the first guide member 55 may be an inclined plate-like member. In this case, the distal end of the first plate member 52*a* may further extend to the upstream side in the conveyance direction.

As described above, on the upstream side of the enclosure part 52 in the conveyance direction, the air laminar flow is guided in the direction away from the conveyance surface 212 by the first guide member 55, so that the flow rate of the air laminar flow toward the inside of the enclosure part 52 can be further suppressed.

Tenth Modification

Figure 16:
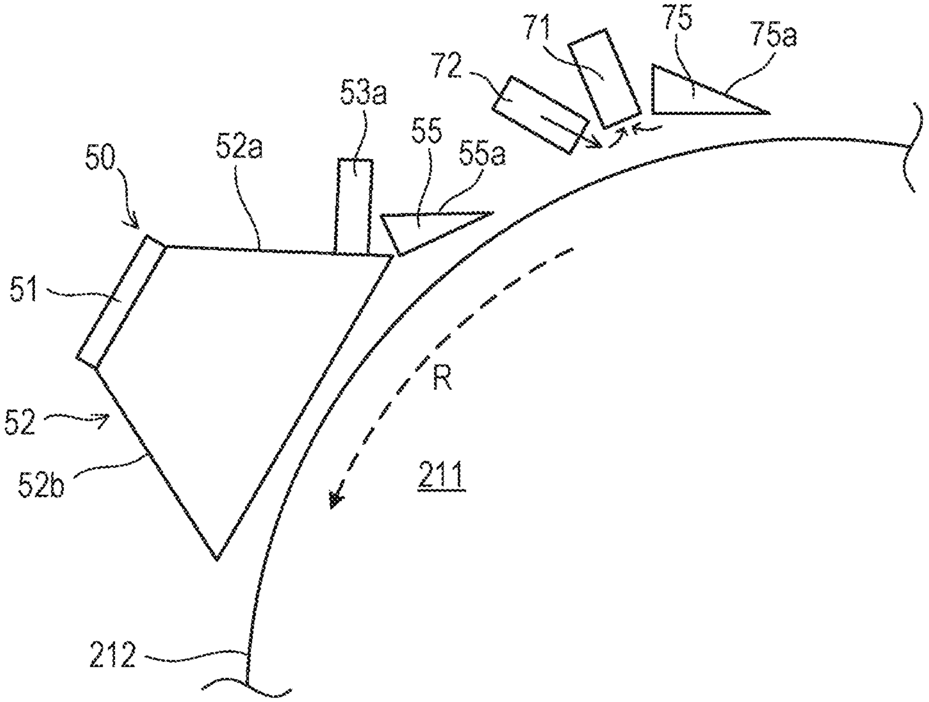
FIG. 16 is a diagram illustrating a configuration including a second guide member that guides the air laminar flow in the direction away from the conveyance surface as a tenth modification of the embodiment of the present invention.

FIG. 16 is a diagram illustrating a configuration including a second guide member 75 that guides an air laminar flow in a direction away from the conveyance surface 212 as a tenth modification of the present embodiment.

In the present modification, the irradiation device 50 illustrated in FIG. 9 further includes the second guide member 75 that guides the air laminar flow in the direction away from the conveyance surface 212. Therefore, in FIG. 16, the same reference numerals are given to the same configurations as those illustrated in FIG. 9, and redundant description thereof will be omitted.

As illustrated in FIG. 16, in the present modification, the irradiation device 50 includes the second guide member 75 that guides the air laminar flow in the direction away from the conveyance surface 212 on the upstream side of the first suction part 71 and the ejector 72 in the conveyance direction.

In the present modification, the second guide member 75 extends across the width of the conveyance unit 21 and is disposed in the vicinity of the first suction part 71 and the ejector 72 and on the upstream side of the first suction part 71 and the ejector 72 in the conveyance direction. The second guide member 75 may be a member that has any shape as long as it has an inclined portion 75*a* that guides the air laminar flow directed from the upstream side in the conveyance direction toward the inside of the enclosure part 52 in the direction away from the conveyance surface 212. In FIG. 16, as an example, the second guide member 75 is a member with a triangular shape in a side view. However, for example, the second guide member 75 may be an inclined plate-like member.

As described above, on the upstream side of the first suction part 71 and the ejector 72 in the conveyance direction, the air laminar flow is guided in the direction away from the conveyance surface 212 by the second guide member 75, so that the flow rate of the air laminar flow toward the first suction part 71 and the ejector 72 can be further suppressed. As described in the second modification and the third modification, the air laminar flow passing through the second guide member 75 toward the first suction part 71 and the ejector 72 is broken by the first suction part 71 and the ejector 72, so that it is possible to further prevent the entry of the air laminar flow into the enclosure part 52.

Eleventh Modification

Figure 17:
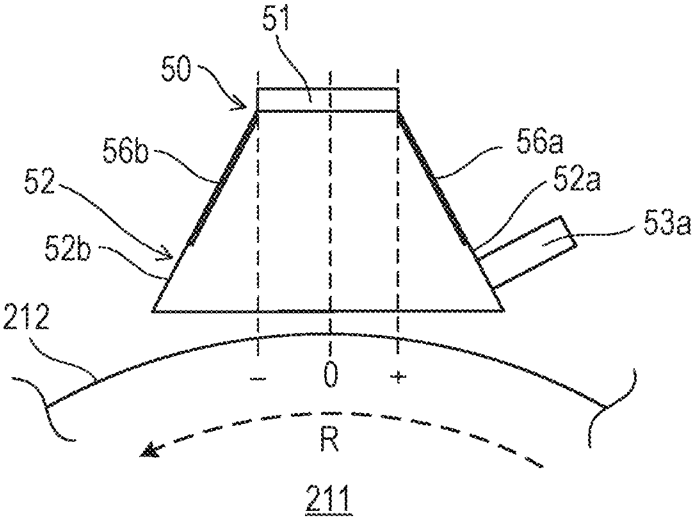
FIG. 17 is a diagram illustrating a configuration including a reflection portion that reflects energy rays as an eleventh modification of the embodiment of the present invention.
Figure 18:
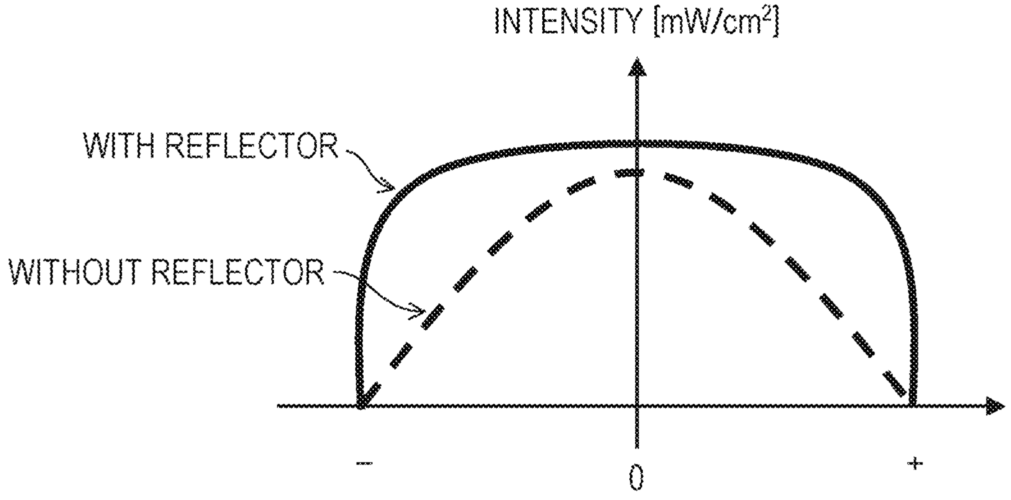
FIG. 18 is a graph showing the intensity of energy rays on the conveyance surface depending on the presence or absence of the reflection portion illustrated in FIG. 17.

FIG. 17 is a diagram illustrating a configuration including a first reflector 56*a* and a second reflector 56*b* that reflect ultraviolet rays as an eleventh modification of the present embodiment. FIG. 18 is a graph showing the intensity of ultraviolet rays on the conveyance surface 212 depending on the presence or absence of the first reflector 56*a* and the second reflector 56*b* illustrated in FIG. 17.

In the present modification, the irradiation device 50 illustrated in FIG. 3A and FIG. 3B further includes the first reflector 56*a* and the second reflector 56*b* that reflect ultraviolet rays. Therefore, in FIG. 17, the same reference numerals are given to the same configurations as those illustrated in FIG. 3A and FIG. 3B, and redundant description thereof will be omitted.

As illustrated in FIG. 17, in the present modification, the irradiation device 50 (the enclosure part 52) includes, on the inner side, the first reflector 56*a* and the second reflector 56*b* that reflect ultraviolet rays irradiated from the irradiator 51 toward the conveyance surface 212.

In the present modification, the first reflector 56*a* and the second reflector 56*b* are disposed on, for example, the entire inner walls of the first plate member 52*a* and the second plate member 52*b* in the enclosure part 52, respectively. Here, two, that is, the first reflector 56*a* and the second reflector 56*b* are disposed, but only one of the first reflector 56*a* and the second reflector 56*b* may be disposed. Furthermore, a reflector may be provided on the inner wall of at least one of the third plate member 52*c* or the fourth plate member 52*d*.

The first reflector 56*a* and the second reflector 56*b* are obtained by, for example, forming the inner walls of the first plate member 52*a* and the second plate member 52*b* as mirror surfaces. For example, in a case where the first plate member 52*a* and the second plate member 52*b* are made of a metal material such as aluminum, the inner wall may be polished to form a mirror surface. In addition, the first reflector 56*a* and the second reflector 56*b* may be formed by attaching a mirror to the inner walls of the first plate member 52*a* and the second plate member 52*b* or may be formed by applying a coating functioning as a mirror to the inner walls of the first plate member 52*a* and the second plate member 52*b*.

As described above, since ultraviolet rays irradiated from the irradiator 51 are reflected toward the conveyance surface 212 by the first reflector 56*a* and the second reflector 56*b* disposed respectively on the inner walls of the first plate member 52*a* and the second plate member 52*b*, the intensity of ultraviolet rays on the conveyance surface 212 can be increased.

Specifically, as illustrated in FIG. 18, in a case where the first reflector 56*a* and the second reflector 56*b* are provided, the intensity of ultraviolet rays on the conveyance surface 212 can be increased as compared with the case where the first reflector 56*a* and the second reflector 56*b* are not provided. In addition, in a predetermined irradiation area (the area from the position of + to the position of − in FIG. 17 and FIG. 18) along the conveyance direction, the irradiation intensity of ultraviolet rays is substantially uniform, and the recording medium P to be conveyed can be uniformly irradiated with ultraviolet rays.

As modifications of the present embodiment, the first to eleventh modifications have been exemplified, but at least two or more of the first to eleventh modifications may be combined to form a modification.

Although embodiments and the first to eleventh modifications of the present invention have been described and illustrated in detail, the disclosed embodiments and modifications are made for purposes of illustration and example only and not limitation. That is, the present invention can be implemented in various forms without departing from the gist or main features thereof. The scope of the present invention should be interpreted by terms of the appended claims.

What is claimed is:

1. An energy ray irradiation device comprising:

an irradiator that faces a conveyance surface and irradiates an ink on a recording medium conveyed on the conveyance surface with an energy ray;

an enclosure part that encloses a space between the irradiator and the conveyance surface by a plate member including a first plate member that extends from an end of the irradiator on an upstream side in a conveyance direction toward the conveyance surface on an upstream side of the end; and a first blowout part that supplies a non-reactive gas that does not react with the ink from an end of the first plate member on the upstream side in the conveyance direction into the enclosure part.

2. The energy ray irradiation device according to claim 1, wherein the conveyance surface is an outer circumferential surface of a conveyance drum, and the first plate member is disposed so as to be inclined with respect to a tangent line at an intersection of an extension line along a direction in which the first plate member extends and the outer circumferential surface.

3. The energy ray irradiation device according to claim 1, further comprising a first adjuster that adjusts a supply direction of the non-reactive gas supplied from the first blowout part.

4. The energy ray irradiation device according to claim 1, further comprising a first suction part that sucks surrounding air on an upstream side of the enclosure part in a conveyance direction.

5. The energy ray irradiation device according to claim 1, further comprising an ejector that ejects air toward an upstream side in a conveyance direction on an upstream side of the enclosure part in the conveyance direction.

6. The energy ray irradiation device according to claim 1, further comprising a first suction part that sucks surrounding air and an ejector that ejects air toward an upstream side in a conveyance direction on an upstream side of the enclosure part in the conveyance direction.

7. The energy ray irradiation device according to claim 1, wherein the enclosure part includes a second plate member that extends from an end of the irradiator on a downstream side in a conveyance direction toward the conveyance surface on a downstream side of the end, and a second blowout part that supplies the non-reactive gas into the enclosure part from an end of the second plate member on the downstream side in the conveyance direction.

8. The energy ray irradiation device according to claim 1, wherein the enclosure part includes a discharge hole that discharges the non-reactive gas.

9. The energy ray irradiation device according to claim 1, further comprising a second suction part that sucks surrounding air on a downstream side of the enclosure part in a conveyance direction.

10. The energy ray irradiation device according to claim 1, wherein the first plate member includes a first guide member that guides an airflow along the conveyance surface in a direction away from the conveyance surface on an upstream side of the enclosure part in a conveyance direction.

11. The energy ray irradiation device according to claim 6, further comprising a second guide member that guides an airflow along the conveyance surface in a direction away from the conveyance surface on an upstream side of the first suction part and the ejector in a conveyance direction.

12. The energy ray irradiation device according to claim 1, further comprising a suction-ejector that sucks surrounding air and ejects the air sucked toward an upstream side in a conveyance direction on an upstream side of the enclosure part in the conveyance direction, wherein the suction-ejector ejects the air sucked on a downstream side of a position where the air is sucked in the conveyance direction.

13. The energy ray irradiation device according to claim 5, further comprising a second adjuster that adjusts an ejection direction of the air ejected from the ejector.

14. The energy ray irradiation device according to claim 5, further comprising a hardware processor that controls an ejection amount of the air ejected from the ejector based on a conveyance speed of the recording medium.

15. The energy ray irradiation device according to claim 6, wherein a ratio of a suction amount of the air sucked by the first suction part and an ejection amount of the air ejected by the ejector is 2:1.

16. The energy ray irradiation device according to claim 1, wherein the enclosure part includes, on an inner side, a reflector that reflects the energy ray toward the conveyance surface.

17. The energy ray irradiation device according to claim 1, wherein the conveyance surface includes a claw that holds an end of the recording medium between the conveyance surface and the claw.

18. An inkjet image forming apparatus comprising:

an image former that forms an image by ejecting an ink from an inkjet head onto a recording medium; and the energy ray irradiation device according to claim 1.

* * * * *